(12) United States Patent
Kemp

(10) Patent No.: US 12,501,976 B2
(45) Date of Patent: Dec. 23, 2025

(54) TRADING CARD COLLECTIBLE STORAGE AND DISPLAY CASE

(71) Applicant: Vaulted Vinyl LLC, Waterloo, IA (US)

(72) Inventor: Shane A Kemp, Washington, DC (US)

(73) Assignee: Vaulted Vinyl LLC, Waterloo, IA (US)

( * ) Notice: Subject to any disclaimer, the term of this patent is extended or adjusted under 35 U.S.C. 154(b) by 0 days.

(21) Appl. No.: 18/435,098

(22) Filed: Feb. 7, 2024

(65) Prior Publication Data

US 2024/0285051 A1 Aug. 29, 2024

Related U.S. Application Data

(63) Continuation-in-part of application No. 29/924,897, filed on Jan. 22, 2024.

(Continued)

(51) Int. Cl.
*A45C 13/02* (2006.01)
*A45C 3/02* (2006.01)
(Continued)

(52) U.S. Cl.
CPC ............... *A45C 13/02* (2013.01); *A45C 3/02* (2013.01); *A45C 13/005* (2013.01);
(Continued)

(58) Field of Classification Search
CPC .... B65D 25/54; B65D 25/108; B65D 25/107; B65D 25/10; B65D 81/051; B65D 81/05
See application file for complete search history.

(56) References Cited

U.S. PATENT DOCUMENTS

| | | | |
|---|---|---|---|
| 582,591 | A | 5/1897 | Salsburg |
| 680,451 | A | 8/1901 | Broadt |

(Continued)

FOREIGN PATENT DOCUMENTS

| | | |
|---|---|---|
| CA | 2119487 A1 | 9/1995 |
| CH | 377493 A | 5/1964 |

(Continued)

OTHER PUBLICATIONS

Casematix case; website "https://www.amazon.com/CASEMATIX-Storage-Compatible-Waterproof-Carrying/dp/B09S86839D/ref=sr_1_1?crid=3EMSZH4BYTH0E&dib=eyJ2ljoiMSJ9.WfG8lxveyOXl eUHaROx33mvdORfhqgaRH9T5ITACcSddDDet2PKL_2H2lbQSa Bz1zunFhg5hYeCMqSQiASaopavC24C8Uz0pzvRNExlvizUoO7U zNAFSr"; Date Captured: Mar. 25, 2025 (Year: 2022).*
Ultra Pro, posted date unknown online, retrieved Aug. 8, 2024. Retrieved from internet https://www.amazon.com/Ultra-PRO-ONE-Touch-Collectible-UV-Resistant/dp/B0B9344WM8/ref=asc_df_B0B9344WM8/?(Year: 2024).

(Continued)

*Primary Examiner* — Javier A Pagan
(74) *Attorney, Agent, or Firm* — Blank Rome LLP

(57) ABSTRACT

A case for storage and display of collectibles includes a base section; a lid section having a display window, the lid section coupled with and moveable relative to the bottom section to allow the case to transition between a closed position and an open position to access an interior space within the case; padding contained within the interior space, the interior space padding having a plurality of first recesses, each of the plurality of first recesses configured to hold a plurality of collectibles; padding contained within the top section, the top section padding having a plurality of second recesses, each second recess configured to hold a single collectible for display to a user through the display window, and allow for release of the single collectible from the second recess by depression of a portion of the single collectible into the second recess.

22 Claims, 13 Drawing Sheets

Related U.S. Application Data

(60) Provisional application No. 63/593,580, filed on Oct. 27, 2023, provisional application No. 63/448,884, filed on Feb. 28, 2023.

(51) Int. Cl.
*A45C 13/00* (2006.01)
*B65D 25/10* (2006.01)
*B65D 25/28* (2006.01)
*B65D 25/54* (2006.01)
*B65D 43/16* (2006.01)
*B65D 43/22* (2006.01)
*B65D 81/05* (2006.01)

(52) U.S. Cl.
CPC ....... *B65D 25/108* (2013.01); *B65D 25/2841* (2013.01); *B65D 25/54* (2013.01); *B65D 43/163* (2013.01); *B65D 43/22* (2013.01); *B65D 81/051* (2013.01); *A45C 2013/026* (2013.01); *A45C 2200/10* (2013.01)

(56) References Cited

U.S. PATENT DOCUMENTS

| | | |
|---|---|---|
| 1,011,747 A | 12/1911 | Clark |
| D119,582 S | 3/1940 | Williams |
| D120,223 S | 4/1940 | Horsley |
| 2,278,866 A | 4/1942 | Dell'Elba |
| 2,521,792 A * | 9/1950 | Hollander ................ B42F 5/02 229/92.9 |
| D174,380 S | 4/1955 | Engels |
| D211,186 S | 5/1968 | Smith |
| 3,813,799 A | 6/1974 | Caravello |
| 3,869,829 A | 3/1975 | Chiosso |
| 4,192,439 A | 3/1980 | Segal |
| D257,913 S | 1/1981 | O'Dair |
| D293,624 S | 1/1988 | Sherman |
| 4,860,468 A | 8/1989 | Cliborn |
| 4,872,723 A | 10/1989 | Kopf |
| 4,964,514 A | 10/1990 | Wycech |
| D318,068 S | 7/1991 | Truc |
| 5,046,616 A | 9/1991 | Makowski |
| 5,074,593 A | 12/1991 | Grosso |
| 5,087,145 A | 2/1992 | Cooley |
| 5,105,567 A | 4/1992 | Real |
| 5,119,574 A | 6/1992 | King |
| 5,150,792 A | 9/1992 | Munroe |
| D332,528 S | 1/1993 | Neal |
| 5,230,426 A | 7/1993 | Keefe et al. |
| D337,887 S | 8/1993 | Feinbloom |
| 5,232,089 A | 8/1993 | Kim |
| D340,803 S | 11/1993 | Kobilarcik et al. |
| D346,067 S | 4/1994 | Bell |
| D349,814 S | 8/1994 | Crisp |
| D353,716 S | 12/1994 | Schur |
| 5,375,352 A | 12/1994 | Morris |
| D358,253 S | 5/1995 | Wong |
| 5,419,062 A | 5/1995 | Polinski |
| 5,462,167 A | 10/1995 | Polinski |
| D375,123 S | 10/1996 | Strang |
| 5,605,389 A | 2/1997 | Kelly et al. |
| D380,612 S | 7/1997 | Kelley |
| D382,142 S | 8/1997 | Kelly |
| D388,963 S | 1/1998 | Williams |
| D393,875 S | 4/1998 | Brooks |
| D396,750 S | 8/1998 | Slater |
| 5,787,626 A | 8/1998 | Bingham |
| D403,535 S | 1/1999 | Wilbert |
| D406,462 S | 3/1999 | Emery |
| D408,154 S | 4/1999 | Kacius |
| D421,051 S | 2/2000 | Jahn |
| D421,525 S | 3/2000 | Lee |
| 6,036,019 A | 3/2000 | Silverman |
| 6,039,495 A | 3/2000 | Zimmerman |
| 6,056,377 A | 5/2000 | Jeter |
| 6,142,314 A | 11/2000 | Cotterill |
| D436,255 S | 1/2001 | Colby |
| 6,282,826 B1 | 9/2001 | Richards |
| 6,349,491 B1 | 2/2002 | Able |
| D456,620 S | 5/2002 | Vincent |
| 6,401,931 B1 | 6/2002 | Javell et al. |
| 6,447,079 B1 | 9/2002 | Irwin |
| D463,911 S | 10/2002 | Chen |
| 6,467,619 B1 | 10/2002 | Leen et al. |
| D467,425 S | 12/2002 | Hardigg et al. |
| D467,426 S | 12/2002 | Hardigg et al. |
| 6,536,149 B1 | 3/2003 | Phillips |
| D477,158 S | 7/2003 | Calcerano |
| D499,883 S | 12/2004 | Perella et al. |
| D509,072 S | 9/2005 | Babich |
| 6,945,785 B2 | 9/2005 | Sohl |
| 7,090,313 B1 | 8/2006 | McMurray |
| D527,900 S | 9/2006 | Dewa |
| 7,410,053 B2 | 8/2008 | Bowen |
| 7,418,796 B2 | 9/2008 | Anastasio |
| D592,402 S | 5/2009 | Ahlgrim |
| D619,808 S | 7/2010 | Huang |
| D641,401 S | 7/2011 | Tewart |
| 8,104,615 B2 | 1/2012 | Liu |
| D660,371 S | 5/2012 | Fuchs |
| D669,684 S | 10/2012 | Johnson |
| D673,774 S | 1/2013 | Neuhaus |
| D677,465 S | 3/2013 | Cenzano et al. |
| D693,155 S | 11/2013 | Wu |
| 8,595,969 B1 | 12/2013 | Wheelis |
| D697,168 S | 1/2014 | Rusten |
| 8,813,403 B2 | 8/2014 | Weinert |
| D720,930 S | 1/2015 | Neuhaus |
| D735,500 S | 8/2015 | Wu |
| D740,378 S | 10/2015 | Walsh-Gomez |
| D740,547 S | 10/2015 | Gorouvein |
| D758,075 S | 6/2016 | Quarry |
| D786,073 S | 5/2017 | Hutcheson |
| D813,538 S | 3/2018 | Gabrielyan |
| 10,212,926 B2 | 2/2019 | Harrell |
| D847,540 S | 5/2019 | Hamilton |
| 10,472,879 B1 | 11/2019 | Galler |
| D873,003 S | 1/2020 | Beilman |
| D873,005 S | 1/2020 | Decarlo et al. |
| D873,014 S | 1/2020 | Shechtman et al. |
| 10,603,464 B2 | 3/2020 | Spens |
| D887,505 S | 6/2020 | Tumpson |
| D891,828 S | 8/2020 | Glaser |
| D891,829 S | 8/2020 | Glaser |
| 10,847,060 B1 | 11/2020 | Rose |
| D928,893 S | 8/2021 | Razon |
| D936,746 S | 11/2021 | Peeters |
| D937,352 S | 11/2021 | Peeters |
| D938,166 S | 12/2021 | Kemp |
| D943,274 S | 2/2022 | Tortorella, Jr. |
| D963,339 S | 9/2022 | Cai |
| D982,910 S | 4/2023 | De Laurentiis |
| D991,483 S | 7/2023 | Mooney |
| D993,324 S | 7/2023 | Spiegel |
| D993,618 S | 8/2023 | Tortorella, Jr. |
| D1,011,747 S | 1/2024 | Li |
| D1,018,045 S | 3/2024 | Hattori |
| D1,029,500 S | 6/2024 | Thorn |
| D1,030,489 S | 6/2024 | Cox |
| D1,034,857 S | 7/2024 | Scarlett |
| 2002/0069567 A1 | 6/2002 | Marino |
| 2004/0031700 A1 | 2/2004 | Hanshaw |
| 2004/0154204 A1 | 8/2004 | Fu |
| 2005/0198884 A1 | 9/2005 | Rukminto |
| 2006/0150464 A1 | 7/2006 | Lindsey |
| 2006/0260966 A1 | 11/2006 | Lake |
| 2009/0033183 A1 | 2/2009 | Kester |
| 2011/0082969 A1 | 4/2011 | Macor |
| 2011/0180452 A1 | 7/2011 | Brandinelli |
| 2014/0265789 A1 | 9/2014 | Metzler |
| 2015/0027017 A1 | 1/2015 | Gregerson |
| 2018/0272180 A1 | 9/2018 | Abrahams |
| 2020/0407144 A1 | 12/2020 | Kemp |

(56) References Cited

U.S. PATENT DOCUMENTS

| | | |
|---|---|---|
| 2022/0022623 A1 | 1/2022 | Lee |
| 2022/0125222 A1 | 4/2022 | Hassanali Issa Hacamo |
| 2022/0258947 A1 | 8/2022 | Ramirez |
| 2022/0270519 A1 | 8/2022 | Fick |
| 2022/0386791 A1 | 12/2022 | Kemp |
| 2023/0127622 A1 | 4/2023 | Williams |

FOREIGN PATENT DOCUMENTS

| | | |
|---|---|---|
| CN | 106429031 A | 2/2017 |
| CN | 209023319 U | 6/2019 |
| CN | 217447271 U | 9/2022 |
| DE | 4036469 A1 | 5/1992 |
| DE | 202017100549 U1 | 5/2017 |
| EP | 1051936 A2 | 11/2000 |
| GB | 2130420 A | 5/1984 |
| GB | 2504667 A | 2/2014 |
| JP | D1255653 | 11/2005 |
| JP | D1255655 | 11/2005 |
| JP | 2006160333 A | 6/2006 |
| KR | 200261379 Y1 | 1/2002 |
| KR | 200329359 Y1 | 10/2003 |
| KR | 20100004381 U | 4/2010 |
| KR | 200457289 Y1 | 12/2011 |
| KR | 20130022222 A | 3/2013 |
| KR | 20140121579 A | 10/2014 |
| KR | 200489090 Y1 | 4/2019 |
| TW | M308259 * | 1/2000 |
| TW | M308259 U | 3/2007 |
| WO | 2017088663 A1 | 6/2017 |

OTHER PUBLICATIONS

Trading Card Display Frame, posted date unknown online, retrieved Aug. 8, 2024. Retrieved from internet https://www.amazon.com/Standard-Protection-Acid-Free-Collector-Basketball/dp/B0BY72XRQG/ref=sr_1_7? (Year: 2024).

https://www.amazon.com/dp/B08JSMP1WM/ref=sspa_dk_detail_0?psc=1&pd_rd_i=B08JSMP1WM&pd_rd_w=9zht8&content-id=amznl.sym.f734d1a2-0bf9-4a26-ad34-2e1b969a5a75&pf_rd_p=f734d1a2-0bf9-4a26-ad34-2e1b969a5a75&pf_rd_r=S8K6N7TV5VXEPG8BYTB4&pd_rd_wg=LXsXm&pd_rd_r=152b2393-6890-4b1c-9e88-78d8f43e1980&s=home-garden&sp_csd=d21k Above reference prior art date: Sep. 23, 2020 Date found: Apr. 3, 2024.

https://www.amazon.com/gp/product/B00YUFZ1LY/ref=ewc_pr_img_1?smid=A1LJQB0JA6R2YV&psc=1 Prior Art Date: Jun. 4, 2015 Date found: Apr. 3, 2024.

"Casematix Graded Card Case Pro Edition", photo reviewed on Mar. 2, 2022, Amazon.com, site visited Sep. 25, 2024: Casematix Graded Card Case Pro Edition (Year: 2022).

"Custom Luxury Book Box Foam Case Inserts", first available Jul. 25, 2022, zouchconverters.co.uk, site visited Sep. 25, 2022: https://zouchconverters.co.uk/news/2022/custom-foam-box-inserts (Year: 2022).

"The Display Vault Card Edition", photo reviewed on Oct. 26, 2023, vaultedcollection.com, site visited Sep. 25, 2024: https://vaultedcollection.com/collections/vaulted-for-cards/products/the-display-vault-card-edition-personalized(Year: 2023).

"Graded Card Storage Box", first available Sep. 6, 2022, Amazon.com, site visited Sep. 25, 2024: https://www.amazon.com/Graded-Storage-Trading-Pokemon-Baseball/dp/B0B49VKPQN/ref=cm_cr_arp_d_product_top?ie=UTF8(Year: : 2022).

Amazon, "GosuToys Clear Plastic Protector Case Compatible for 4-inch Funko Pop Figures (40 Pack)," First reviewed Dec. 14, 2017. (https://www.amazon.com/Gosu-Toys-Plastic-Protector-Compatible/dp/B076VV1Z2K) (Year: 2017).

Facebook, Photos, User @VaultedVinyl. Posted Jun. 1-Feb. 2018. (https://facebook.com/pg/VaultedVinyl/photos/?ref=page_internal) (Year: 2018).

Trading card slab frame, retrieved from internet, [site visited on Jun. 6, 2024], URL:https://ridanco-displays.co.uk/products/9- graded-trading-card-slab-frame-white-39x29mm (Year: 2024).

Collectible card treasure, retrieved from internet, [site visited on Jun. 6, 2024], JRL:https://sportcard24.com/product/psa-book (Year: 2024).

Jewelry display, retrieved from internet, [site visited on Jun. 6, 2024], URL:https://shorturl.at/XmYQQ (Year: 2024).

Sorting_Tray_Grid_Display, retrieved from internet, [site visited on Jun. 6 2024], URL: https://www.amazon.com/ Sorting-Display-Organizer-Finished-Compartments/dp/B0BVFY8K6V (Year: 2024).

The Display Vault Air Card Edition, retrieved online, [site visited Jan. 10, 2025], URL: https://www.youtubecom/watch?v=Jhd-y9Hu8KE (Year: 2024).

* cited by examiner

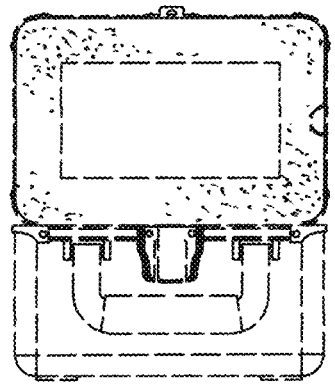
FIG. 7(a)
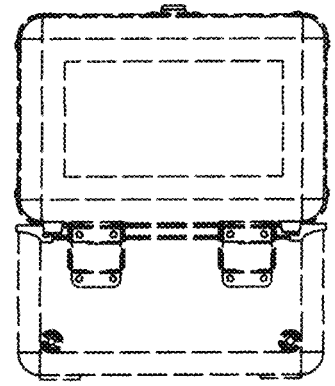
FIG. 7(b)
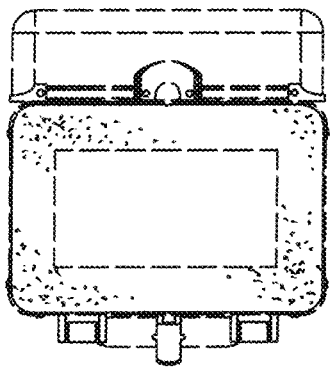
FIG. 7(c)
FIG. 7(d)
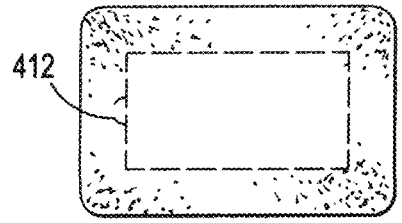
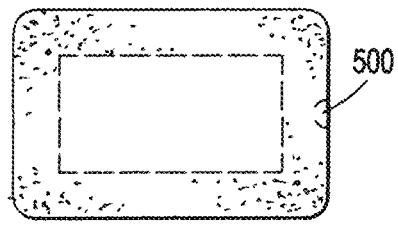
FIG. 7(e)
FIG. 7(f)

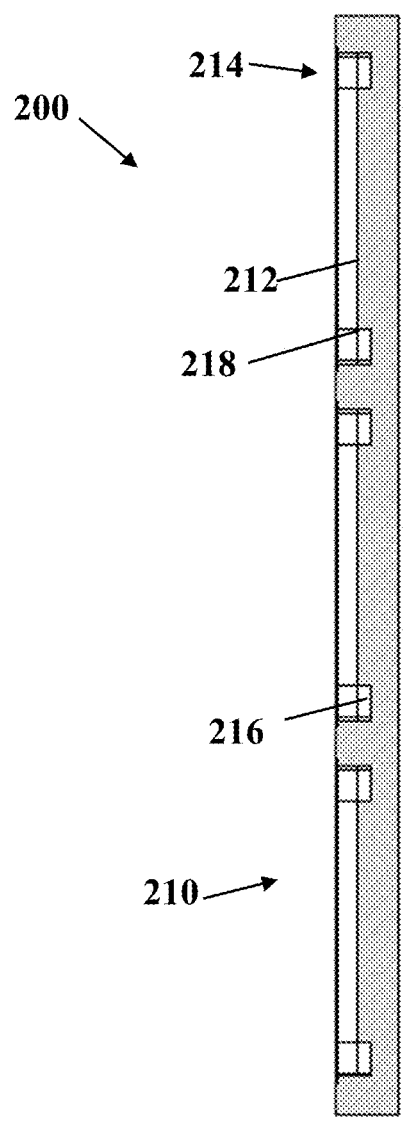
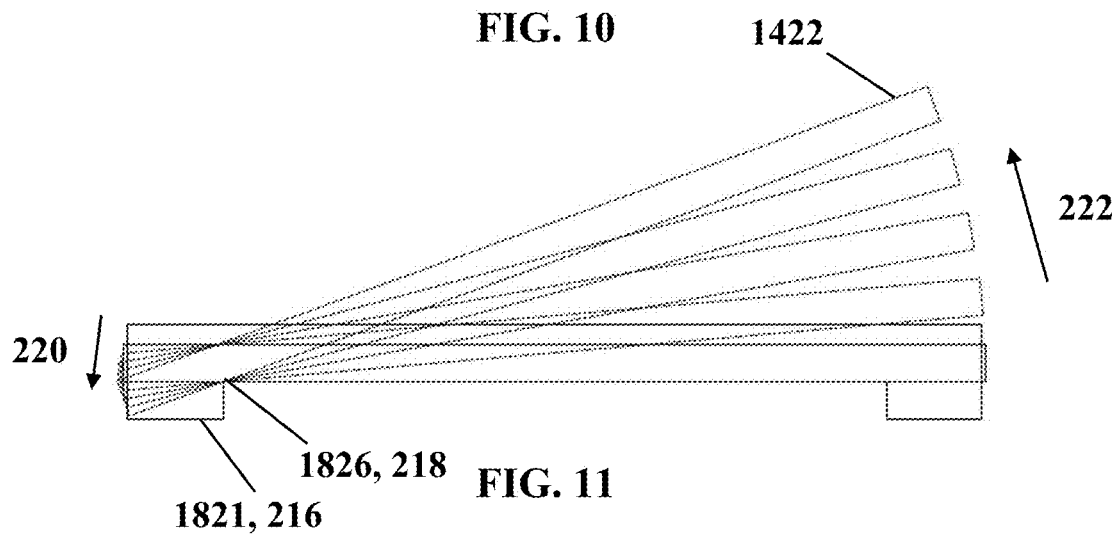
FIG. 10
FIG. 11

TRADING CARD COLLECTIBLE STORAGE AND DISPLAY CASE

RELATED APPLICATIONS

This application claims the benefit of priority of U.S. Provisional Application No. 63/448,884, filed Feb. 28, 2023, and U.S. Provisional Application No. 63/593,580, filed Oct. 27, 2023, and is a continuation-in-part of U.S. application Ser. No. 29/924,897, filed Jan. 22, 2024. The entire content of those applications is relied upon and incorporated herein by reference in its entirety.

FIELD OF THE INVENTION

The present invention relates to cases for the storage and display of collectibles. More specifically, the present invention relates to transportable cases having separate collectible storage and collectible display sections.

BACKGROUND OF THE DISCLOSURE

A collectible is any item that has some interest to a collector or is otherwise sought out by collectors. There are a wide range of collectibles, including freestanding collectibles and dependent (non-freestanding) collectibles. Freestanding collectibles can stand upright on their own without support. Figures or figurines are one type of freestanding collectible, such as Funko POPS!, and characters from movies, television, video games or pop culture. Often, figurine collectibles are similar in size to each other, but have very different shapes. However, the figurine collectible can be packaged in protective containers or boxes that have a standard shape. For example, figurine collectibles, and particularly Funko POPS!, are all different shapes but relatively the same size and can each be individually packaged in a box that has a rectangular cuboid shape and has a viewing window at at least a portion of the front of the box. The figurine collectibles are configured to stand upright without support, and are elongated with a comparable length (x-direction), height (y-direction), and width or depth (z-direction). Likewise, the box packaging has a rectangular cuboid shape with a horizontally-extending (i.e., parallel to the bottom and top of the box, in the x-z plane) transverse cross section that is substantially square-shaped or slightly rectangular in shape, whereby the depth and width of the box provides sufficient support for the box to reliably stand upright on its own without support.

Trading card collectibles are a type of dependent (non-freestanding) collectible that has a growing community of collectors and can include, for example, sports cards, POKÉMON cards, and entertainment-related cards. Those collectibles are standard in size (width, height) and shape. For instance, trading card collectibles are rectangular and formed of a thin, flat, flexible, bendable, sheet made of laminated card stock with printing on one or both sides. Trading card collectibles are typically sold in smaller groups of single cards or 5-20 cards and packaged in a sealed wrapper, and are also sold in larger quantities of 50, 100 or 800 cards, and contained in a cardboard box. For example, baseball trading card collectibles are sold in packs of 4-16 cards, and also in boxes that hold 24, 30 or more packs per box, and a case can be used to hold multiple boxes. More valuable cards can be individually placed in a flexible bendable sleeve or a rigid case that are transparent so that the card can be viewed on one or both sides. As mentioned, individual trading cards are thin and flexible (small width, z-direction), and therefore unable to stand upright on their own. As shown in FIG. 5, a rigid plastic collectible housing, namely a protector case 1412, 1422, can hold an individual trading card, but even those are not reliably freestanding due to the small width (z-direction), relative to its length and height, and are prone to falling over onto its front or rear face.

Collectors often store or view collectibles at various locations, such as their home, office, or events, and transport those collectibles between those locations. Collectibles are stored on a table or shelving, so that the collectible may be viewed by the collector. However, typical shelving does not protect collectibles from dust and damage from ultraviolet (UV) light or accidental dropping. At the same time, collectibles are often transported, for example to trading events, and then displayed at those events. Collectors typically transport collectibles in bags or boxes. Again, those collectibles are not protected from accidental damage unless the collector takes the time to wrap each individual collectible in a protective material.

Display cases have been provided for figurine collectibles that are contained in rectangular cuboid-shaped containers, such as shown in U.S. Pat. No. D938166, and U.S. Publ. Appl. Nos. 2020/0407144, and 2022/0386791. However, those cases are not suitable for thin collectibles, such as trading card collectibles. Accordingly, there is a need for devices that protect collectibles while those collectibles are stored, displayed, and/or transported. For collectibles having a standard size and shape, storage and display devices may be specifically designed to protect collectibles of a standard size while those collectibles are stored, displayed, and transported.

SUMMARY OF THE INVENTION

In one embodiment, a case is for storage and/or display of a collectible. The case has a base section, and a lid section with a display window. The lid section is coupled with and moveable relative to the base section to allow the case to transition between a closed position and an open position to access an interior space within the case. A base padding is contained within the base section at the interior space, the base padding having a plurality of storage recesses, each of the plurality of storage recesses configured to hold one or more collectibles. A lid padding is contained within the lid section at the interior space, the lid padding having one or more display recesses, each of the one or more display recesses configured to hold a single collectible for display to a user through the display window. A channel is positioned at an end of the one or more display recesses and forming a pivot point adjacent the channel, whereby when a first end of the single collectible is depressed, the single collectible pivots about the pivot point to position the first end into the channel and position a second end outside of the display recess for removal.

BRIEF DESCRIPTION OF THE DRAWINGS

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which:

FIG. 7(a) is a front view of a collectible storage and display case in accordance with an embodiment of the disclosure, in an open position;

FIG. 7(b) is a rear view of FIG. 7(a);

FIG. 7(c) is a top view of FIG. 7(a);

FIG. 7(d) is a top view of the lid padding of FIG. 7(a);

FIG. 7(e) is a bottom view of the lid padding of FIG. 7(a);

FIG. 7(f) is a side view of the lid padding of FIG. 7(a);

FIG. 10 is a side view of the wall mount of FIG. 8;

FIG. 11 is a side view showing different positions of the collectible as the collectible is inserted and/or removed from one of the shaped recesses;

DETAILED DESCRIPTION

Figure 1A:
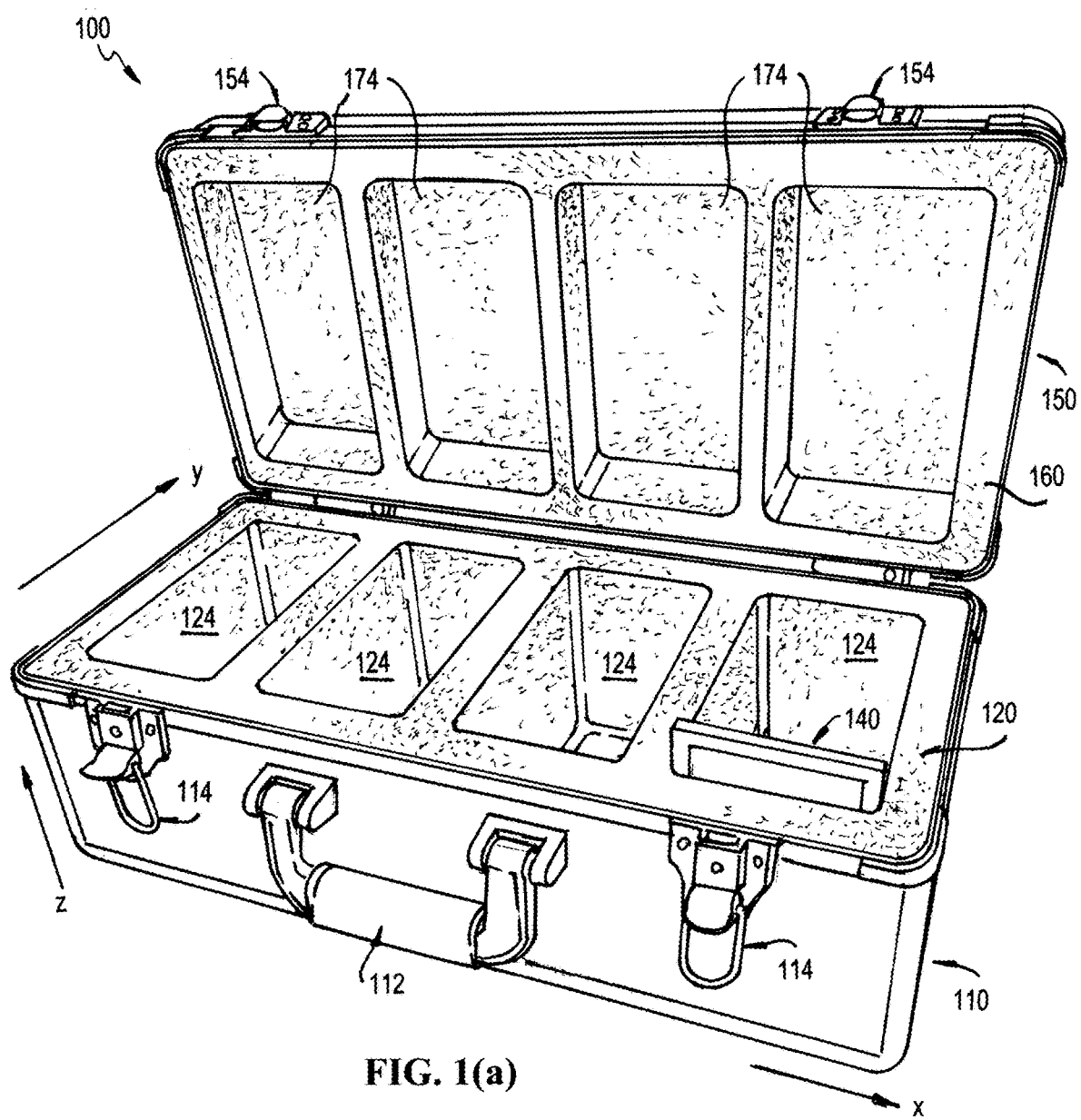
FIG. 1(a) is a perspective view of a collectible storage and display case according to various aspects of the disclosure, with the case in an open position to show an interior space of the case having padding in the top lid section and the bottom base section.

The following description of the embodiments is merely exemplary in nature and is in no way intended to limit the subject matter of the disclosure, their application, or uses.

For the purposes of this specification and appended claims, unless otherwise indicated, all numbers expressing quantities, percentages or proportions, and other numerical values used in the specification and claims, are to be understood as being modified in all instances by the term "about." The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent, alternatively ±5 percent, alternatively ±1 percent, alternatively ±0.5 percent, and alternatively ±0.1 percent of the given numeric value provided such a deviation does not alter the end function or result of the value. Accordingly, unless indicated to the contrary, the numerical parameters set forth in this specification and attached claims are approximations that can vary depending upon the desired properties sought to be obtained by the present invention.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. For example, as used in this specification and the following claims, the terms "comprise" (as well as forms, derivatives, or variations thereof, such as "comprising" and "comprises"), "include" (as well as forms, derivatives, or variations thereof, such as "including" and "includes") and "has" (as well as forms, derivatives, or variations thereof, such as "having" and "have") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

FIGS. 1-7 are views of a collectible storage and display case 100 according to various aspects of the disclosure. As illustrated in FIGS. 1(a), 1(b), 1(c), 2, 5(a), the case 100 includes a bottom or base section 110, a base padding or foam insert 120 (shown separately in further detail in FIG. 3(d)), a lid (cover) or top section 150, and a lid padding or foam insert 160 (shown separately in further detail in FIGS. 3(a), 3(b), 3(c), 4). The lid section 150 has a transparent display window 155 at the top 152 of the lid section 150.

One or more hinges 130 pivotally couple the base section 110 to the top section 150 so the case 100 can be opened and closed. The base section 110 has a rectangular-shaped bottom panel and four rectangular-shaped walls or wall panels extending outward orthogonally from the base, and an open top, to form an open-ended rectangular prism or cuboid with a base interior space. The top section 150 has a rectangular-shaped top panel and four rectangular-shaped walls or wall panels extending outward orthogonally from the top, and an open bottom, to form an open-ended rectangular prism or cuboid with a lid interior space. Thus, the base interior space and the lid interior space combine to form the case interior space.

The base section 110 and the lid section 150 are rotatably connected by one or more hinges 130. The hinge 130 allows a user to transition the case 100 between a closed position (FIG. 5(a)) and an open position (FIGS. 1(a), 1(b), 1(c), 2) to deny and grant access to the case interior space. The base section 110 and the lid section 150 may be made at least in part of a durable material such as, for example, aluminum or an alloy thereof, steel, carbon fiber, a polycarbonate (PC), a polyvinylchloride (PVC), a polyester reinforce fiberglass, a polymethylmethacrylate (PMMA), a polyethylene terephthalate (PET), a polyether ether ketone (PEEK) and so on.

The base section 110 includes a handle 112 for a user to carry the case 100 when the case 100 is in a closed position. The base section 110 and the lid section 150 further include plastic or rubber feet 116, 156, respectively, for instances where a user desires to place the case 100 in a standing position on a floor or other surface. The base section 110 further includes latching members 114 configured to engage respective aligned latching members 154 on the lid section 150. When engaged with each other, the latching members 114, 154 securely hold the case in a closed position. The latching members 114, 154 can be any suitable type of latch, such as, for example, cam latches, compression latches, slam latches, draw latches, spring latches, push-to-close latches, hasps, and so on. In some instances, the latching members 114, 154 can be configured to engage each other with the use of a lock-and-key or number combination locking mechanism to securely hold the case 100 in the closed position and prevent unauthorized opening and/or tampering of the case 100 by third parties.

A base foam insert 120 is removably received in the base section 110 of the case, and a lid foam insert 160 is removably received in the lid section 160 of the case 100. The base foam insert 120 has a plurality of rectangular cuboid shaped base collectible storage openings or recesses 124. The lid foam insert 160 has a top portion with a plurality of display recesses that display collectible protector cases 1412 through the display window 155 at the top 152 of the display case 100. The lid foam insert 160 also has a bottom portion with a plurality of rectangular cuboid shaped lid collectible openings or recesses 174. The base storage recesses 124 align with the lid storage recesses 174 to form a single enclosure that receives and completely encloses one or more collectibles 140 stored in collectible housings, protector cases 1412, with a majority of the protector cases 1412 received in the base storage recess 124. When the case 100 is in the open position, the top end of the protector cases 1412 protrudes out of the base storage recess 124 so that it is readily accessible by the user to remove and insert protector cases 1412. When the case 100 is in the closed position, the top end of the protector cases 1412 is received in the lid storage recesses 174.

Base Foam Insert 120

Referring to FIGS. 1(a), 1(b), 1(c), 3(d), the base interior space of the base section 110 receives a base support insert in the form of a base body or body member, here shown as a base foam or padding 120. The base padding 120 has an outer dimension that is substantially the same as the inner dimension of the base section 110, namely a rectangular cuboid. The base padding 120 is slightly smaller in size than the base section 110 so that it fits snugly in the base interior space to form a friction fit between the outer dimension of the base padding and the inner dimension of the base section 110 so that the base padding 120 does not inadvertently get removed from the base section 110.

One or more base collectible storage openings or recesses 124 are formed in the base padding 120. The base recesses 124 can have any suitable shape, such as square or rectangular, to fit the shape of the collectible or collectible protector cases to be contained therein. Each of the base recesses 124 have an open facing side and extend mostly through the base padding 120 to form a top padding wall, bottom padding wall, and two side padding walls, as well as a closed rear facing padding side. The base recesses 124 extend from the front facing side of the base section 110 to the rear facing side of the base section 110, but do not extend entirely though the base padding 120 so that each base recess is entirely surrounded by padding except at the open front face.

Figure 4:
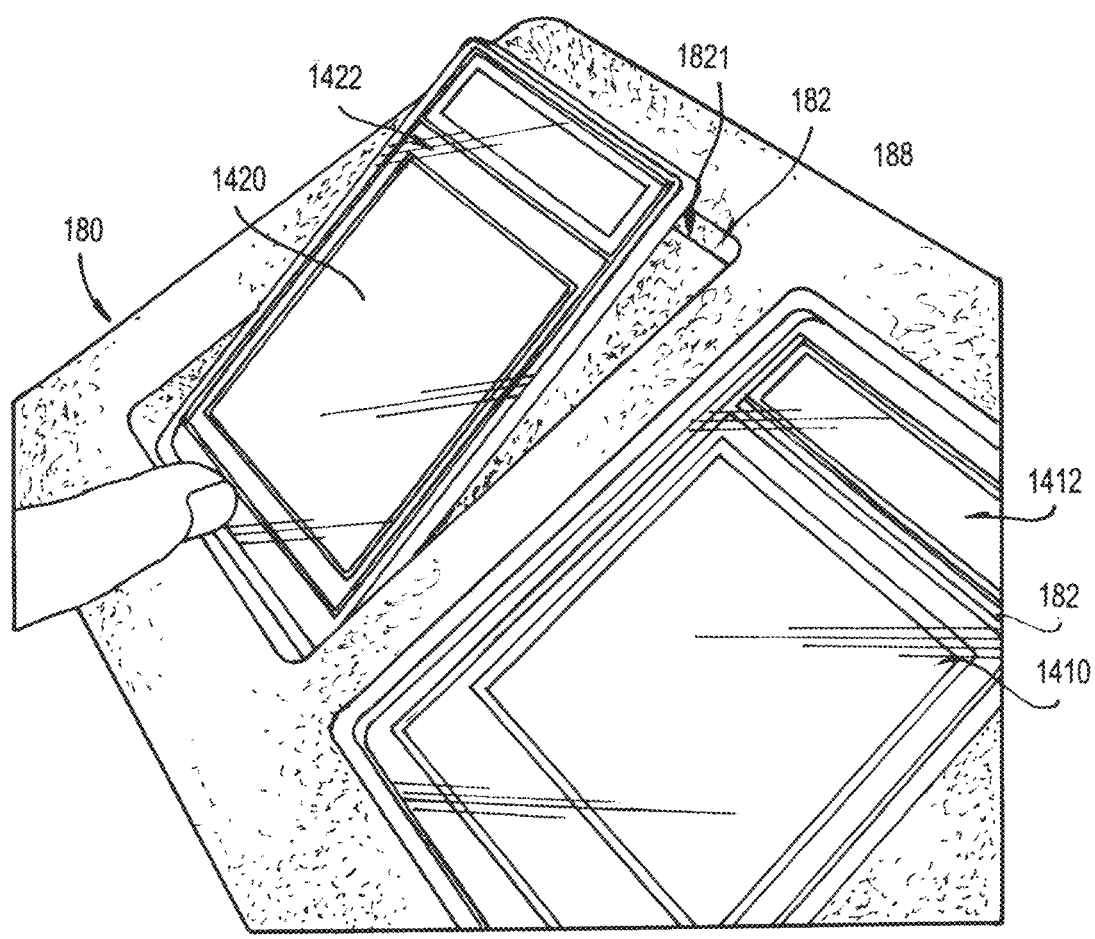
FIG. 4 is a perspective partial view of the lid padding, for use in a top section of a collectible storage and display case, having collectibles in rigid protector cases stored therein and illustrating removal of the rigid collectible cases therefrom.
Figure 5A:
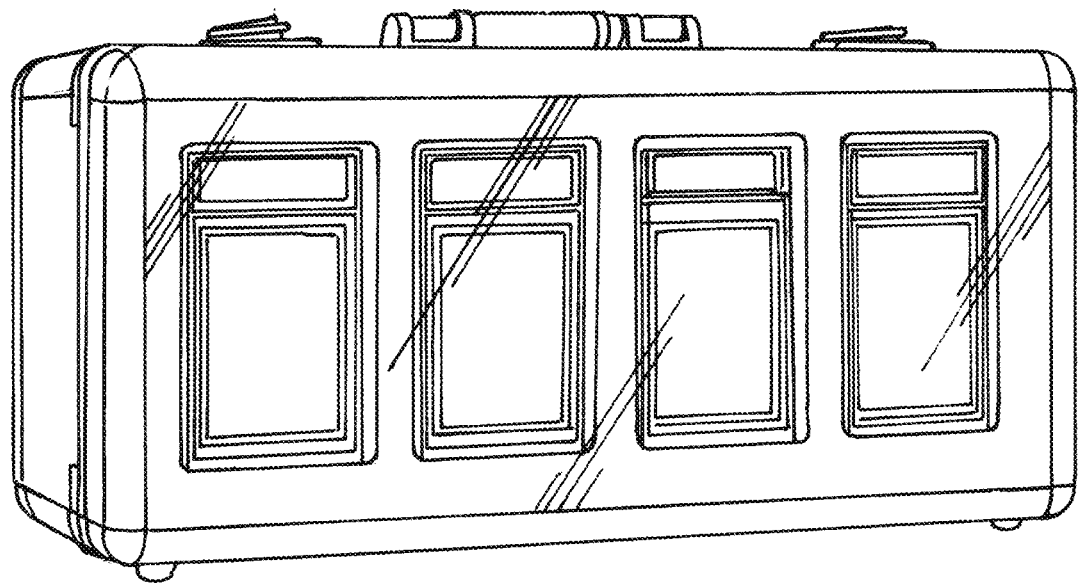
FIG. 5(a) is a perspective view of the collectible storage and display case, with the case in a closed position with collectibles in rigid collectible cases received in the plurality of shaped recesses (with the collectible images (baseball player) removed)
Figure 5B:
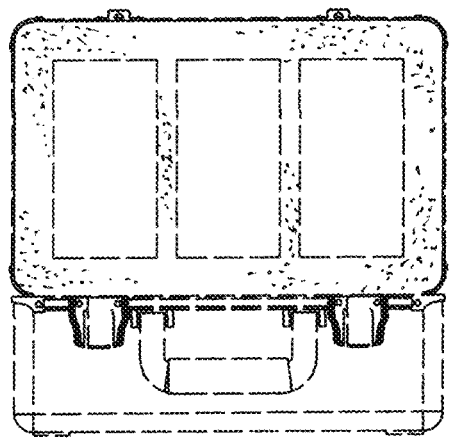
FIG. 5(b) is a front view of FIG. 5(a) in an open position.
Figure 5C:
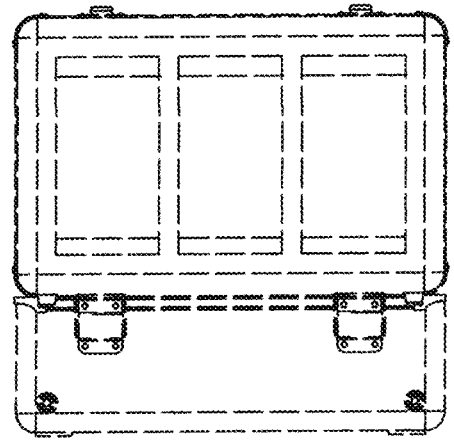
FIG. 5(c) is a rear view of FIG. 5(a) in an open position.
Figure 5D:
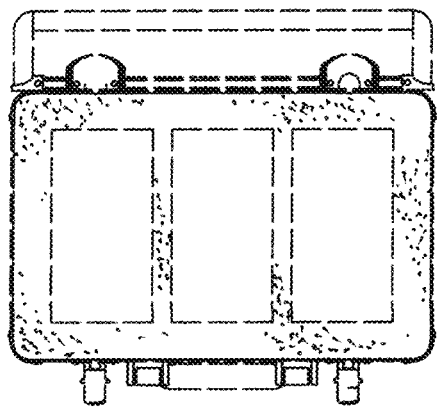
FIG. 5(d) is a top view of FIG. 5(a) in an open position.
Figure 6A:
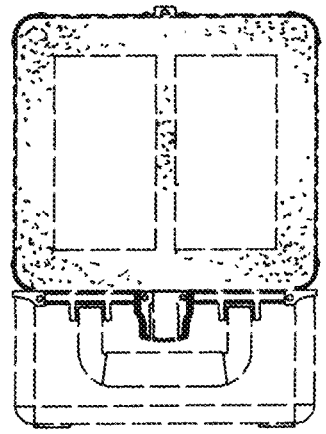
FIG. 6(a) is a front view of a collectible storage and display case in accordance with an embodiment of the disclosure, in an open position.
Figure 6B:
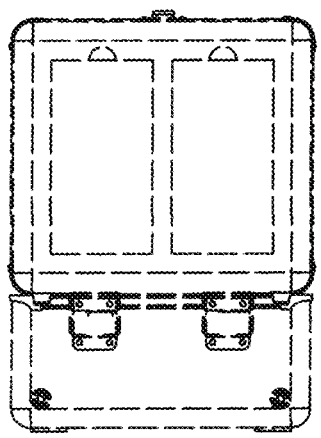
FIG. 6(b) is a rear view of FIG. 6(a)
Figure 6C:
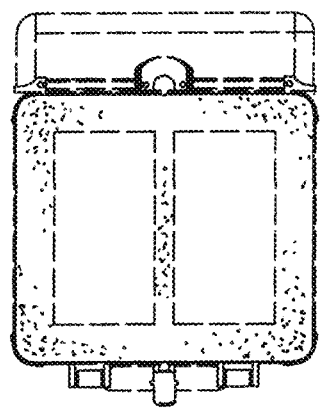
FIG. 6(c) is a top view of FIG. 6(a)
Figure 6D:
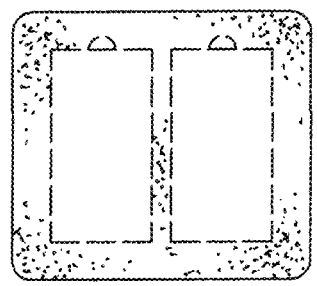
FIG. 6(d) is a top view of the lid padding of FIG. 6(a)
Figure 8:
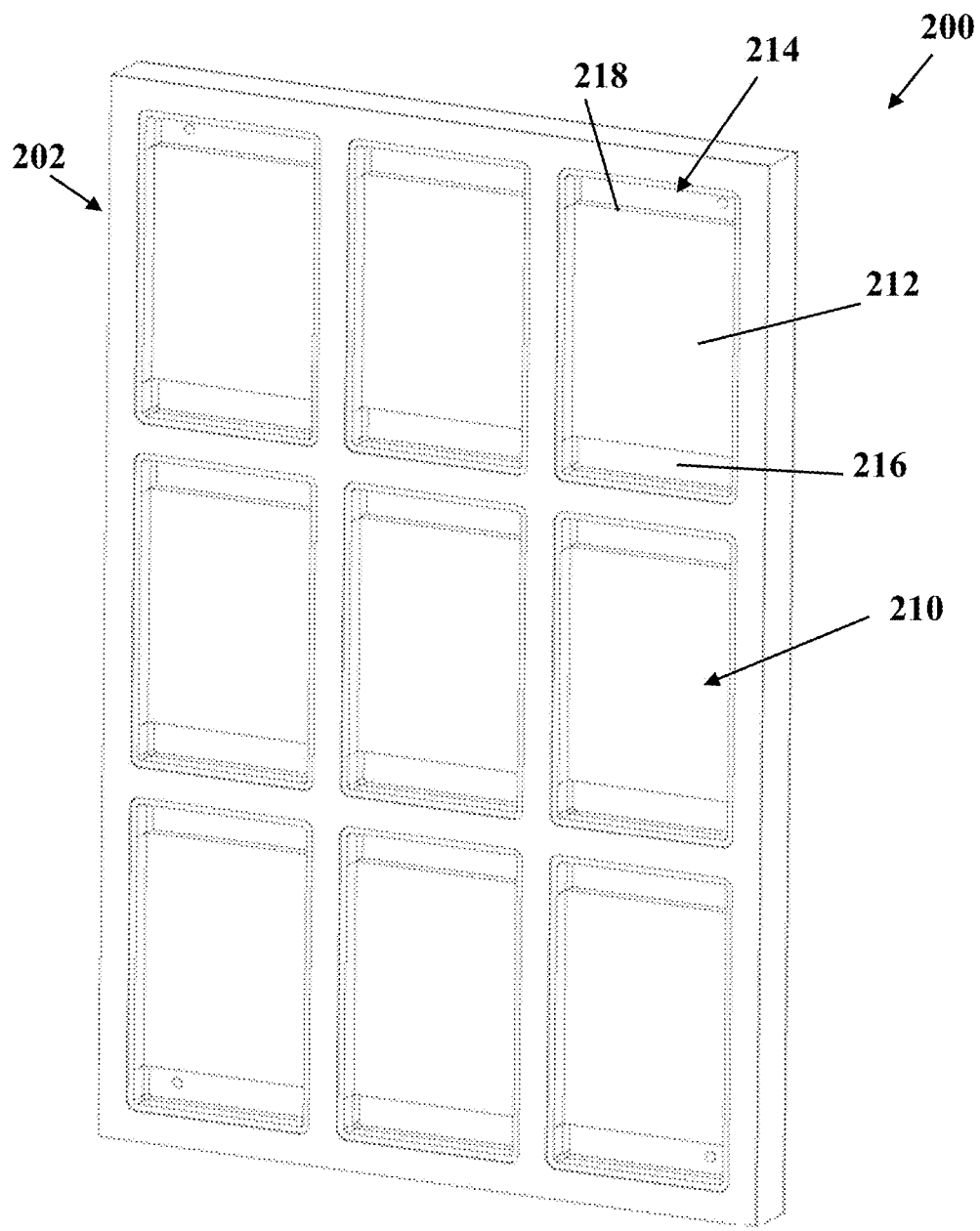
FIG. 8 is a perspective view of a storage and display wall mount according to various aspects of the disclosure.
Figure 9:
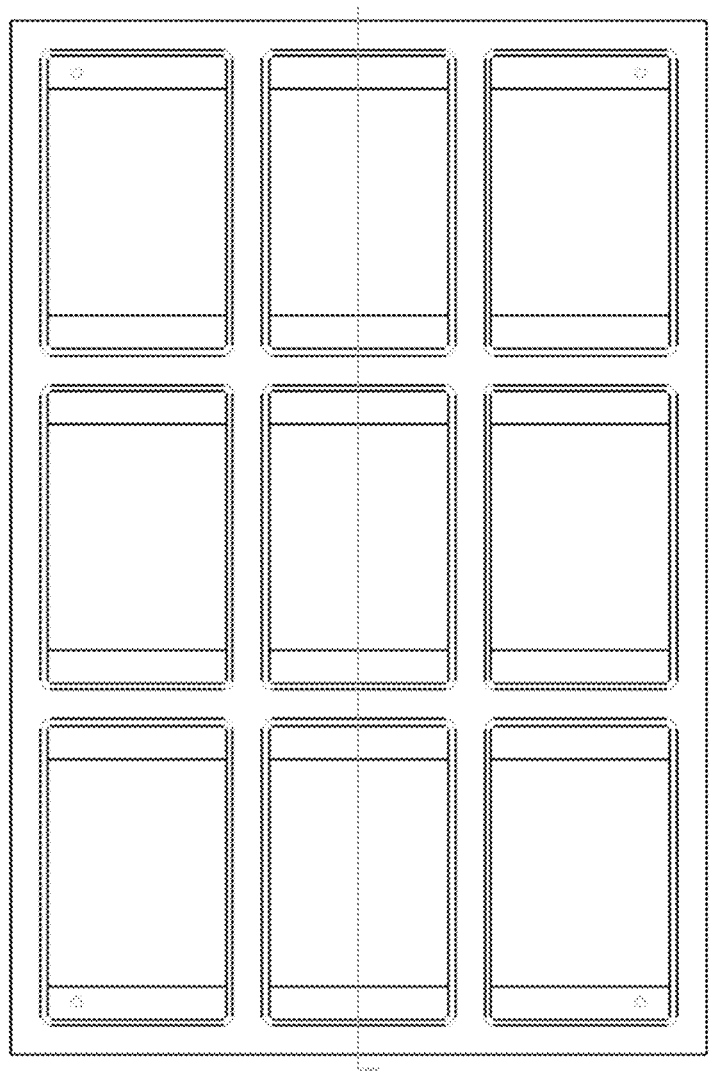
FIG. 9 is a front view of the wall mount of FIG. 8.

As further shown in FIG. 1(a), the base recesses 124 each receive a plurality of trading card-type collectibles 1410 that are each contained in a rigid protector case 1412 (see FIG. 4). The depth of the base recess 124 is shorter than the length of the protector case 1412, so that the protector case 1412 extends above the front face of the base padding 120. In that way, the user can easily grab the collectible protector case 1412 to remove the collectible case 1412 from the base recess 124. The base recesses 124 are sized to form a snug friction fit with the collectible protector cases 1412 so that the cases 1412 are easy to remove from the base recess 124 but do not inadvertently fall out of the base recess 124 on their own and stay upright in the base recess 124 without falling down within the base recess. Of course, any suitable sizing can be used, and there need not be a friction fit but the padding side padding walls protect the protector cases 1412 and prevent the protector cases 1412 from moving left and right.

Figure 3:
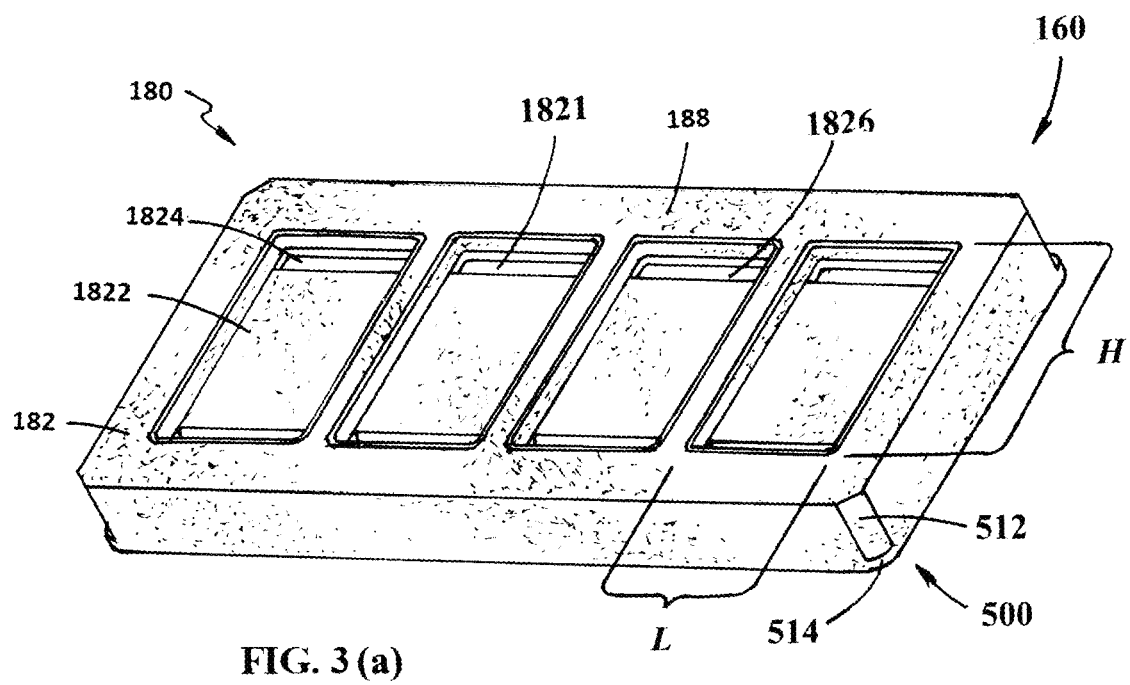
FIG. 3(a) is a perspective view of padding in a top section of a collectible storage and display case according to various aspects of the disclosure, the padding of the top section having a plurality of shaped recesses for holding and displaying individual collectibles therein.
FIG. 3(b) is a top view of FIG. 3(a)
FIG. 3(c) is a bottom view of FIG. 3(a)
FIG. 3(d) is a top view of padding in a bottom section of a collectible storage and display case.
Figure 3B:
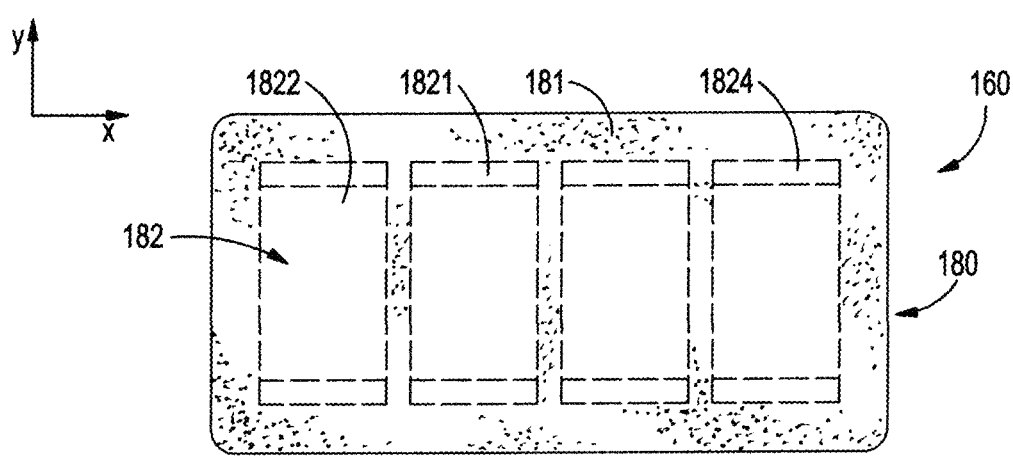

In some embodiments, a plurality of base recesses 124 are provided, arranged in rows and/or columns with one another. In the embodiment of FIG. 1(a), four base recesses 124 are formed in the base padding 120 and arranged in a single row with four columns so that the elongated lengths are parallel to one another. As best shown in FIG. 3(d), three interior walls 126 extend along the longitudinal direction (y-direction) of the base recesses 124, from the front side (the longitudinal bottom in FIG. 3(d)) of the base padding 120 to the rear side (the longitudinal top in FIG. 3(d)) of the base padding 120, orthogonal to the front and rear sides of the base padding 120 and the base section 110, and parallel to the sides (the left and right transverse sides in FIG. 3(d)) of the base padding 120 and base section 110. The interior walls 126 separate the base recesses 124 from each other. The two end base recesses 124 have one side wall at the side of the base section 110, and an interior wall with the neighboring base recess 124. The two interior base recesses 124 have an interior wall positioned between the two neighboring recesses 124.

Each of the base storage recesses 124 is aligned with a respective one of the lid storage recesses 174 and can be defined as having the same length and height dimensions as each other. However, the depth of the base storage recess 124 is substantially greater than the depth of the lid storage recess 174. Thus, when the case 100 is in the closed position, one of the base recesses 124 of the base section 110 and a corresponding one of the top recess 174 of the lid section 150, form an internal collectible recess storage compartment. In the embodiment of FIGS. 1, 2, the interior space of the case 100 includes four base storage recesses 124 and four lid storage recesses 174, resulting in four separate internal collectible storage compartments when the case 100 is in the closed position.

Each internal collectible storage compartment is sized to house and securely hold in place a plurality of collectibles 140 contained in collectible protector cases 1412. In some embodiments, as shown in FIG. 1, each collectible 140 can have a relatively flat or thin rectangular shape, and the plurality of collectibles 1410 are arranged directly adjacent to one another in a stacked fashion, so that the front and rear faces of each collectible protector case faces the adjacent collectible protector case, and are parallel with the front and rear of the bottom section 110 of the case 100, and orthogonal to a top display window 155. In addition, the protector cases 1412 stand upright in the base recess 124, with a front planar surface of the protector case 1412 orthogonal to the planar storage recess bottom surface 182 and parallel to the front and rear recess walls. That is, the length (x-direction) of the protector case 1412 extends from one longitudinal side of the recess to the other longitudinal side of the recess (i.e., from the left to the right in FIG. 1(a)). Thus, the recesses 124 have a same length as the collectible 140, or is slightly smaller in length than the collectible 140 so that the collectible 140 forms a friction fit in the recess 124 without inadvertently falling down in or out of the recess 124, or is slightly larger in length than the collectible 140 so the collectible is easily received in the recess 124. And the combined height of the recesses 124, 174 is the same as, or slightly larger than, the height of the collectible protector case 1412. The height of the recesses 124, 174 is much greater than the depth or thickness of the collectible protector cases 1412, so that multiple collectibles 140 can be stackably received in a single recess 124, 174.

It should be clear that any number of interior walls can be provided, and arranged in different directions to define recesses of different sizes and shape. For example, one or more interior cross-support walls can be positioned in one or more of the base recess 124, orthogonal to the interior walls 126 and parallel to the front and rear padding walls to form smaller base recesses 124 that are arranged in columns, so that each protector case 1412 is surrounded by padding on all sides (other than the top face). Thus, one or more interior divider walls can be provided in each recess 124 of the base section 110 and/or each recess 174 of the lid section 150, to form a plurality of recesses or otherwise separate the collectibles 140 from one another so that they do not directly touch each other. In addition, the walls of the padding 120 extend from the top to the bottom of the recesses to provide maximum support to the protector cases, but in other embodiments the padding walls can have openings to reduce weight and material.

It is further noted that the recesses 124 are generally rectangular in shape and aligned parallel to each other so that the collectible 140 faces the front of the case 100. However, any suitable size and shape recess 124, 174 can be utilized within the spirit and scope of the disclosure. And each recess 124 of the base section 110 and each recess 174 of the lid section 150 need not have the same size and shape.

Lid Foam Insert 160

Figure 1B:
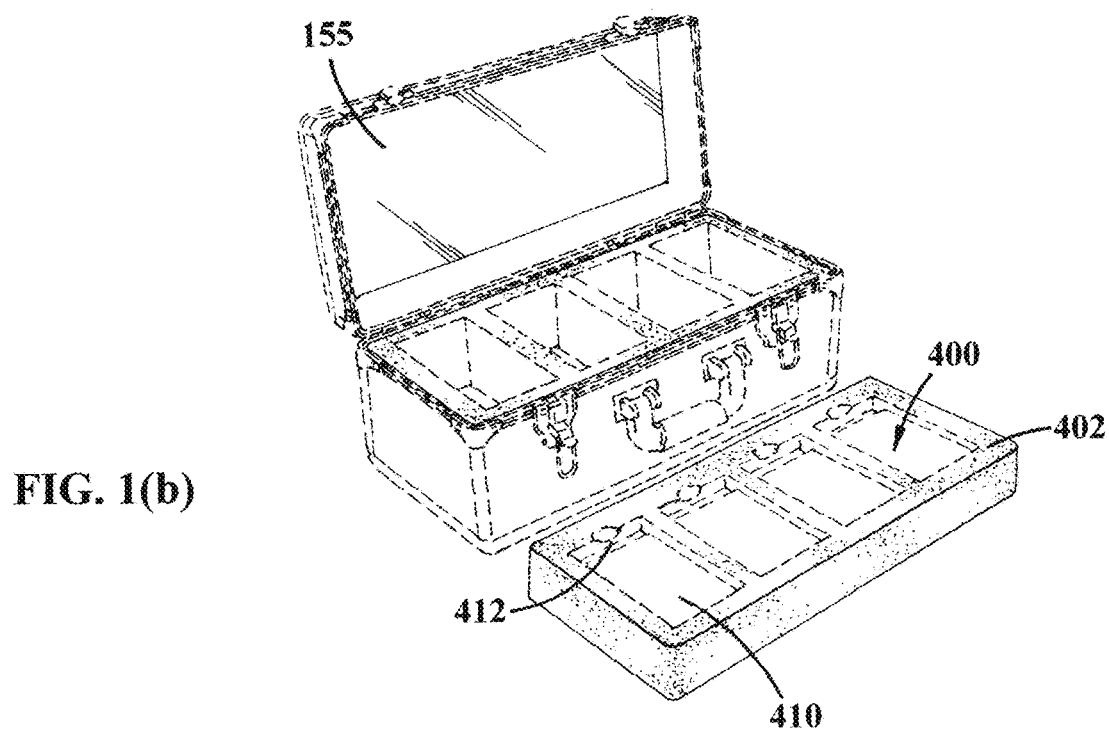
FIG. 1(b) is a perspective view of the collectible storage and display case of FIG. 1(a), with the case in an open position and the padding of the top lid section removed.
Figure 2:
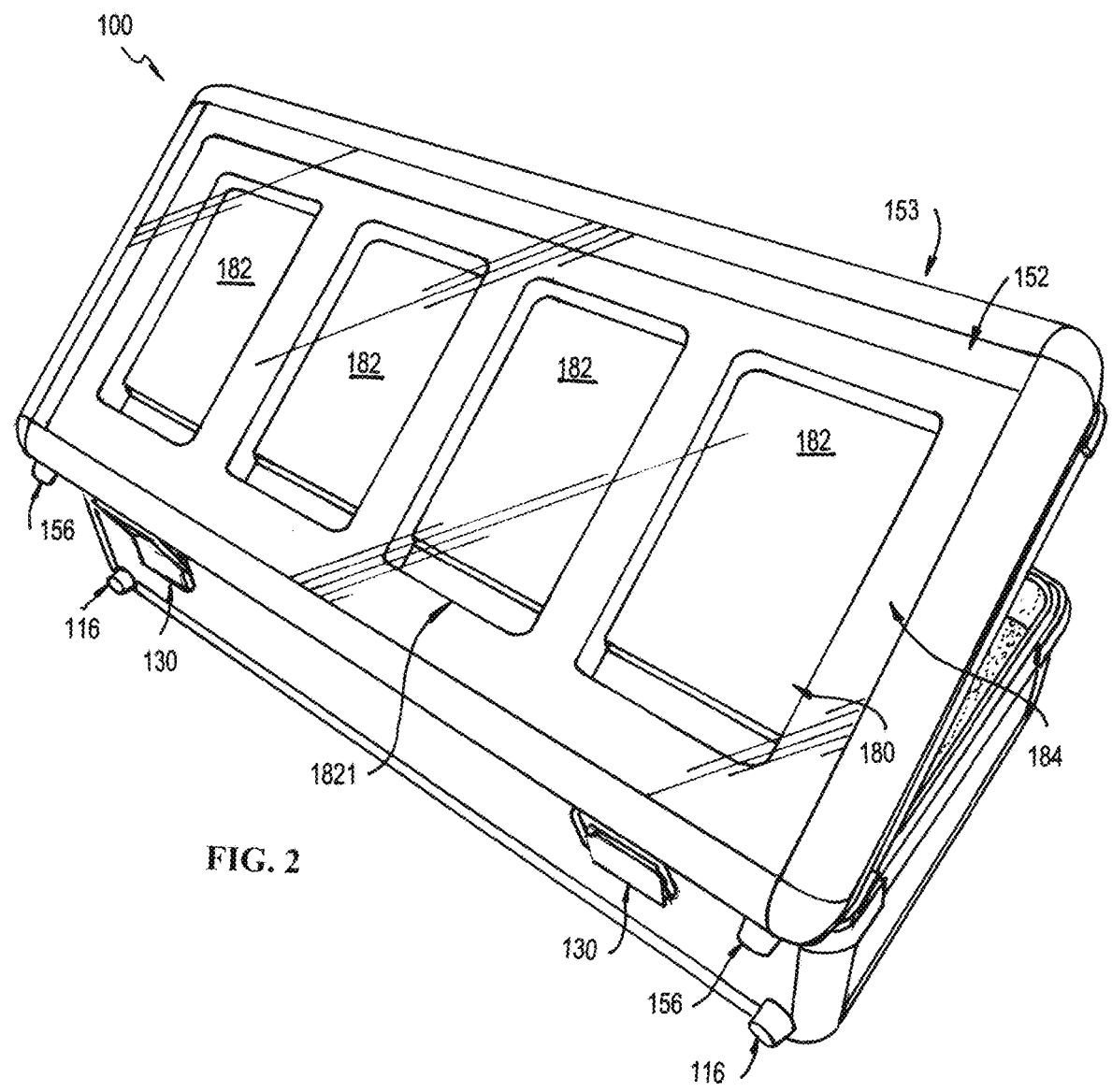
FIG. 2 is a perspective view of a collectible storage and display case according to various aspects of the present disclosure, showing aspects of the top portion of the case.
Figure 3C:
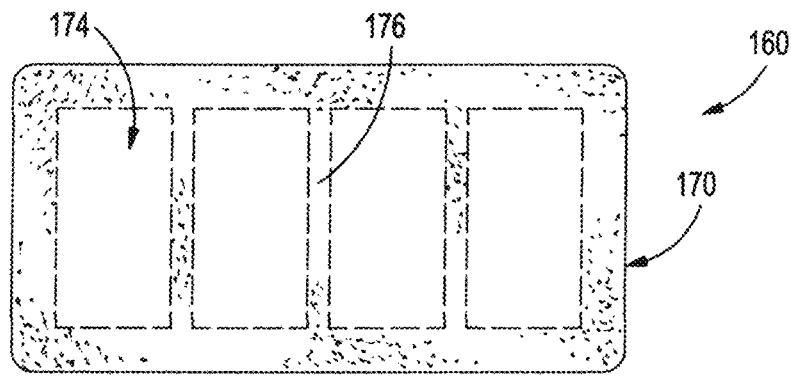
Figure 3D:
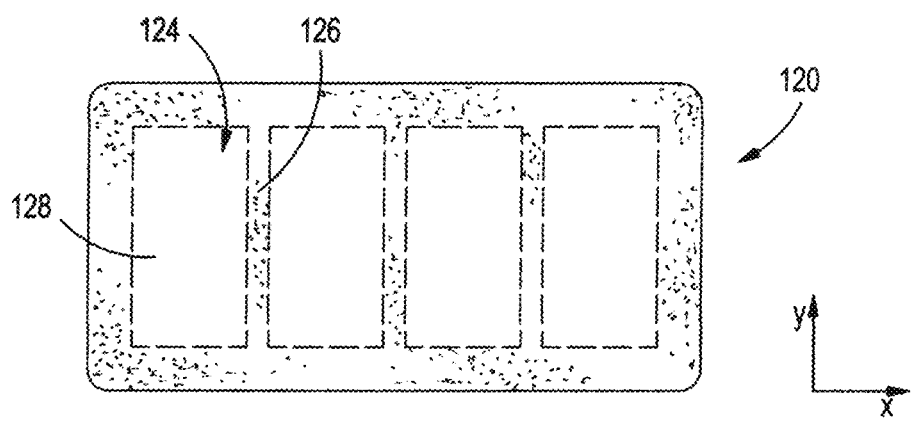

Referring to FIGS. 1(a), 1(b), 3(c), the lid interior space of the lid section 150 receives a lid support insert in the form of a lid body or body member, here shown as the lid foam or padding 160. The lid padding 160 has an outer dimension that is substantially the same as the inner dimension of the lid section 150, namely a rectangular cuboid. The lid padding 160 is slightly smaller in size than the lid section 150 so that it fits snugly in the base interior space to form a friction fit between the outer dimension of the lid padding and the inner dimension of the lid section 150 so that the lid padding 160 does not inadvertently get removed from the lid section 150.

Figure 1C:
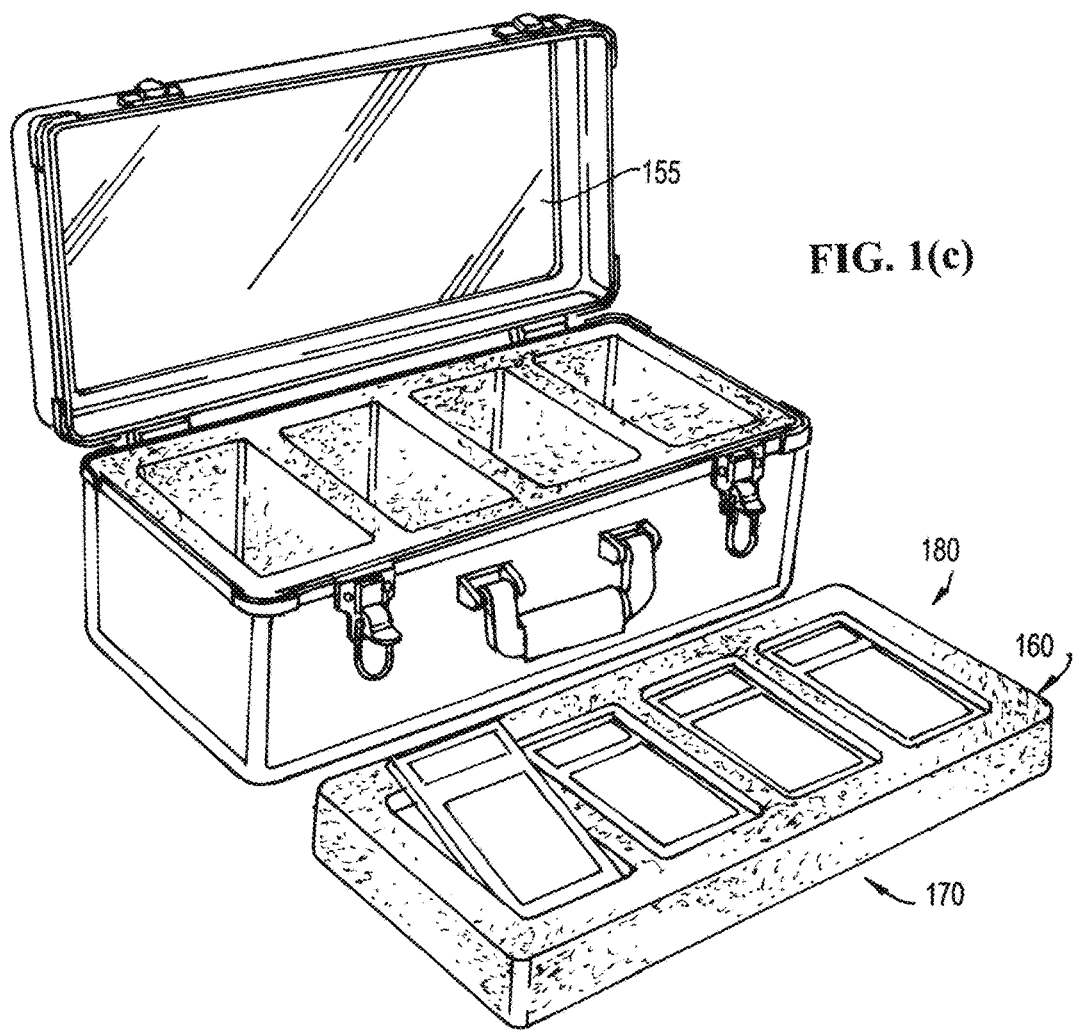
FIG. 1(c) is a perspective view of the collectible storage and display case of FIG. 1(a), with the case in an open position and the padding of the top lid section removed, and illustrating trading cards contained in individual rigid protector cases positioned in recesses of the top lid section.

FIGS. 1(b), 1(c), 3(a) best illustrate the lid padding 160 of the case 100. The lid padding 160 is removably received in the lid interior space of the lip section 150. The lid padding 160 has a bottom side or portion 170 (also shown in FIGS. 1(a), 3(c)) and a top side or portion 180 (also shown in FIGS. 2, 3(a), 3(b)). The bottom portion 170 is on an opposite side of the top portion 180. When the case 100 is closed, the bottom portion 170 of the lid padding 160 faces inwardly toward the base foam 120 in the base section 110, and the top portion 180 of the lid padding 160 faces outwardly away from the base foam 120 and the base section 110, and toward the display window 155 at the top side 152 of the lid 150 section.

The bottom portion 170 has a first set of recesses, here shown as one or more collectible storage recesses 174, and the top portion 180 has a second set of recesses, here shown as one or more display recesses 182. The storage recesses 174 are at an opposite side of the display recesses 182 and cooperate with the base storage recesses 124 to fully enclose a plurality of stacked collectible protector cases. Each display recess 182 is sized to securely hold a single collectible 140 in a rigid collectible protector case 1142 and position that single collectible to be visible through the display window 155 at the top 152 of the lid section 150. In some instances, the top surface 188 (FIG. 3(a)) of the padding 180 can be covered with an ornamental and/or protective layer 184.

Bottom Portion 170 of the Lid Foam Insert 160

One or more lid collectible storage openings or recesses 174 are formed in the bottom portion 170 of the lid padding 160. The lid storage recesses 174 are configured to cooperate with the base storage recesses 124 to full surround and enclose the collectible protector cases 1412 with padding when the case 100 is closed, to protect the collectibles during transport. The lid storage recesses 174 can have any suitable shape, such as square or rectangular, to fit the shape of the collectible or collectible protector cases to be contained therein. Each of the lid recesses 174 have an open facing side and extend partly through the lid padding 120 to form a top padding wall, bottom padding wall, and two side padding walls, as well as a closed rear facing padding side. The lid recesses 174 extend from the front facing side of the lid section 150 to the rear facing side of the lid section 150, but do not extend entirely though the lid padding 160 so that each lid recess is entirely surrounded by padding except at the open front face.

As further shown in FIG. 1(a), the lid recesses 174 each receive a top portion of a plurality of trading card-type collectibles 1410 that are each contained in a rigid protector case 1412 (see FIG. 4). The depth of the lid recess 174 is sized to only receive a top end of the protector case 1412 which extends above the front face of the base padding 120. When the case 100 is open, the collectible protector case 1412 is retained in the base storage recesses 124. In that way, the user can easily grab the collectible protector case 1412 to remove the collectible case 1412 from the base recess 124. When the case 100 is closed, the top end of the collectible protector case 1412 is received in the lid storage recess 174 to protect the collectible protector cases 1412 and prevent the collectible protector cases 1412 from moving in and out of the base storage recesses 124.

In some embodiments, a plurality of lid recesses 174 are provided, arranged in rows and/or columns with one another. In the embodiment of FIG. 1(a), four lid recesses 174 are formed in the lid padding 160 and arranged in a single row with four columns so that the elongated lengths are parallel to one another. As best shown in FIG. 3(c), three interior lid storage walls 176 extend along the longitudinal direction (y-direction) of the lid recesses 174, from the front side (the longitudinal bottom in FIG. 3(c)) of the lid padding 160 to the rear side (the longitudinal top in FIG. 3(c)) of the lid padding 160, orthogonal to the front and rear sides of the lid padding 160 and the lid section 150, and parallel to the sides (the left and right transverse sides in FIG. 3(c)) of the lid padding 160 and lid section 150. The lid interior storage walls 176 separate the lid recesses 174 from each other. The two end lid recesses 174 have one side wall at the side of the lid section 150, and a lid interior storage wall with the neighboring lid recess 174. The two interior lid storage recesses 174 have an interior lid storage wall positioned between the two neighboring lid storage recesses 174.

Each of the lid storage recesses 174 is aligned with a respective one of the base storage recesses 124 and can be defined as having the same length and height dimensions as each other. However, as noted above, the depth of the base storage recess 124 is substantially greater than the depth of the lid storage recess 174. Thus, when the case 100 is in the closed position, one of the base recesses 124 of the base section 110 and a corresponding one of the top recess 174 of the lid section 150, form an internal collectible recess storage compartment. In the embodiment of FIGS. 1, 2, the interior space of the case 100 includes four base storage recesses 124 and four lid storage recesses 174, resulting in four separate internal collectible storage compartments when the case 100 is in the closed position.

Each internal lid collectible storage compartment is sized to house and securely hold in place the top end of a plurality of collectibles 140 contained in collectible protector cases 1412. In some embodiments, as shown in FIG. 1, each collectible 140 can have a relatively flat or thin rectangular shape, and the plurality of collectibles 1410 are arranged directly adjacent to one another in a stacked fashion, so that the front and rear faces of each collectible protector case faces the adjacent collectible protector case, and are parallel with the front and rear of the bottom section 110 of the case 100. In addition, the protector cases 1412 stand upright in the base recess 124. That is, the length (x-direction) of the protector case 1412 extends from one longitudinal side of the recess to the other longitudinal side of the recess (i.e., from the left to the right in FIG. 1(a)). Thus, the recesses 174 have a same length as the collectible 140, or is slightly smaller in length than the collectible 140 so that the collectible 140 forms a friction fit in the recess 174 without inadvertently falling down in or out of the recess 174, or is slightly larger in length than the collectible 140 so the collectible is easily received in the recess 174. And the combined height of the recesses 124, 174 is the same as, or slightly larger than, the height of the collectible protector case 1412. The height of the recesses 124, 174 is much greater than the depth or thickness of the collectible protector cases 1412, so that multiple collectibles 140 can be stackably received in a single combined recess 124, 174.

It should be clear that any number of interior walls 176 can be provided, and arranged in different directions to define recesses of different sizes and shape. For example, one or more interior cross-support walls can be positioned in one or more lid storage recess 174, orthogonal to the interior walls 176 and parallel to the front and rear padding walls to form smaller lid storage recesses 174 that are arranged in columns, so that each protector case 1412 is surrounded by padding on all sides (other than the top face). Thus, one or more interior divider walls can be provided in each recess 174 of the lid section 150 and/or each recess 124 of the base section 110, to form a plurality of recesses or otherwise separate the collectibles 140 from one another so that they do not directly touch each other. In some embodiments, the same number and size lid storage recesses 174 are provided as base storage recesses 124. However, in other embodiments, there can be fewer lid storage recesses 174 than base storage recesses 124. For example, a single lid storage recess 174 can be provided for a single column of multiple base storage recesses 124, so that the collectible protector cases 1410 in a given column have an individual base storage recess 124 but share a common lid storage recess 174, since the individual base storage recesses 124 enclose most of the protector case 1412 and the lid storage recess 174 only encloses the top end of the protector case 1412.

It is further noted that the lid storage recesses 174 are generally rectangular in shape and aligned parallel to each other so that the collectible 140 faces the front of the case 100. However, any suitable size and shape recess 124, 174 can be utilized within the spirit and scope of the disclosure. And each base storage recess 124 of the base section 110 and each lid storage recess 174 of the lid section 150 need not have the same size and shape.

Top Portion 180 of the Lid Section 150

FIGS. 1(b), 1(c), 2, 5(a) show the top or top side 152 of the lid 150. The lid 150 has four sides or side walls extending away from the top 152. The lid top 152 includes a display window 155 and a bezel (i.e., border) 153 that extends around the outside of the display window 155. Thus, the lid section 150 has a lid top outer surface that includes the display window 155, and may include a portion fo the bezel 153. The display window 155 allows for display of the top padding surface 188 of the top portion 180 of the lid padding 160, including the display of collectibles 140 that are located in the shaped display recesses 182 of the top padding surface 188.

The display window 155 can be made of any suitable material such as for example, a tempered glass, a shatter-proof glass, an acrylic, a polycarbonate, a polyether ether ketone, and so on. The display window may be coated with, for example, a resin to protect the display window from scratches or abrasions. The display window 155 may also be coated with, for example, an ultraviolet (UV)-adsorbing layer to protect the collectibles located in the recesses 182 from UV radiation. The display window 155 may extend nearly the entire length (x-direction) and height (y-direction) of the lid section 150, allowing a user to see all of the collectibles 140 contained within the shaped lid padding display recesses 182, while leaving only a small frame or bezel 153, i.e., border around the outside of the display window 155. The display window 155 may be slightly recessed from the bezel 153 to protect the display window from damage if the case 100 is dropped. In other embodiments, the top 152 can be a solid material, such as a flat rigid plastic or wood sheet, and have a plurality of windows located in the flat sheet, each window aligned with a respective display recess 182.

Top Portion 180 of the Lid Foam Insert 160

FIGS. 1(b), 1(c), 2, 3(a), 3(b), 4, 5(a) show the top portion 180 of the lid padding insert 160. The top padding portion 180 has a top surface 188 that includes one or more lid display recesses 182 and a frame or frame area 183 that surrounds the display recesses 182. Each of the top display recesses 182 of the lid section 150 are configured to retain an individual collectible 140, such as in a direction that is perpendicular to the direction of the collectibles 140 in the base storage recesses 124, and parallel to the top surface and lid window 155 of the planar top section 150 so that the collectible 140 is visible to the user when the case 100 is opened or closed, through the window 155 and the transparent collectible protector case 1412.

The one or more lid collectible display openings or recesses 182 are formed in the lid padding 160. The lid display recesses 182 can have any suitable shape, such as square or rectangular, to fit the shape of the collectible or collectible protector cases to be contained therein. Each of the display recesses 182 have an open facing side and extend partly through the lid padding 160 to form a top padding wall, bottom padding wall, and two side padding walls, as well as a closed rear facing padding bottom. The lid display recesses 182 extend from the front facing side of the lid section 150 to the rear facing side of the lid section 150, but do not extend entirely though the lid padding 150 so that each display recess is entirely surrounded by padding except at the open front face.

As further shown in FIG. 1(c), the lid display recesses 182 each receive a single trading card-type collectibles 1410 that are each contained in a rigid protector case 1412 (see FIG. 4). The depth of the lid display recess 182 is smaller than the depth of the protector case 1412, so that the protector case 1412 lies flat in and is recessed within the top surface of the lid padding 160. The lid display recesses 182 are sized to form a snug friction fit with the collectible protector cases 1412 so that the cases 1412 are easy to remove from the display recess 182 by use of a removal feature, but do not inadvertently fall out of the display recess 182 on their own and stay recessed in the display recess 182. Of course, any suitable sizing can be used, and there need not be a friction fit but the padding side padding walls protect the protector cases 1412 and prevent the protector cases 1412 from moving left and right.

In some embodiments, a plurality of display recesses 182 are provided, arranged in rows and/or columns with one another. In the embodiment of FIG. 1(b), 1(c), four display recesses 182 are formed in the lid padding 160 and arranged in a single row with four columns so that the elongated lengths are parallel to one another. Three interior walls extend along the longitudinal direction (y-direction) of the display recesses 182, from the front side (the longitudinal bottom) of the lid padding 160 to the rear side (the longitudinal top) of the lid padding 160, orthogonal to the front and rear sides of the lid padding 160 and the lid section 150, and parallel to the sides (the left and right transverse sides) of the lid padding 160 and lid section 150. The interior walls separate the lid recesses 182 from each other. The two end lid display recesses 182 have one side wall at the side of the lid section 150, and an interior wall with the neighboring lid display recess 182. The two interior lid recesses 182 have an interior wall positioned between the two neighboring recesses 182.

It is further noted that the display recesses 182 are generally rectangular in shape and aligned parallel to each other so that the collectible 140 faces outward toward the top of the case 100. However, any suitable size and shape recess 182 can be utilized within the spirit and scope of the disclosure.

Each of the shaped display recesses 182 of the top portion 180 of the lid padding 160 are dimensioned to provide a friction fit therebetween to securely hold a single collectible 140 and prevent them from contacting one another and from contacting the inside surface of the display window 155 during transport.

FIG. 3(a) further illustrates the top portion 180 of the lid padding 160 and the shaped lid display recesses 182. Each shaped recess 182 can have a rectangular shape defined as having a length L (x-direction) and a height H (y-direction) with a shape and dimensions suitable to house and securely hold in place the dimensions and shape of a single collectible 140. When the collectible 140 is, for example, a rectangular sports or gaming card contained within a card protector 1410, the dimensions (L×H) of the rectangular display recesses 182 can be about 82 millimeters (mm)×134 mm. The length L and height H can be slightly smaller than the length and height of the collectible protector case 1412 (or collectible, if no case), to form a friction fit. The depth (z-direction) of the display recess 182 is greater than the depth/width of the collectible protector case 1412, so the collectible case 1412 is recessed within the display recess 182 and is recessed with respect to the top surface 181 of the lid padding 180, so that the collectible case 1412 does not contact the display window 155. In addition, the friction fit between the collectible protector case 1412 and the display recess 182 ensures that the protector case 1412 does not inadvertently come free from the display recess 182, so that the collectible protector case 1412 does not come into contact with the display window 155. Generally, however, the dimensions of the shaped recesses 182 can be varied based upon the type of collectible to be stored and displayed in the case 100.

As best shown in FIGS. 3(a), 3(b), each shaped display recess 182 has a top end and a bottom end, and a removal or extraction channel 1821 formed at one end of the recess 182, or at both ends of the recess 182. The channel 1821 extends the entire length of the recess 182 and is deeper than the recess 182. That is, the recess has a first surface 1822 that forms the bottom of the recess, and a second surface 1824, where the distance of the first surface 1822 from the top surface 188 is less than the distance of the second surface 1824 from the top surface 188. Thus, the channel 1821 forms a step between the first and second surfaces 1822, 1824, and a lip or edge 1826 is formed at the top corner of the first surface 1822 of the step adjacent the channel, defining a pivot point. As illustrated in FIG. 3, each of the first surface 1822 and the second surface 1824 extend along the entirety of the width L. The channel 1821 is aligned with the top end or bottom end of the collectible protector case 1412 and is sufficiently tall in height so that a portion of the top end or bottom end of the protector case 1412 can be received in the channel 1821.

When the collectible 140 is, for example, a trading card contained within a card protector, the distance of the first surface 1822 from the top surface 188 can range from about 6 millimeters (mm) to about 12 mm, alternatively from about 7 mm to about 11 mm, alternatively from about 8 mm to about 10. In some instances, the distance of the first surface 1822 from the top surface 188 is preferably between about 8 mm and about 10 mm, and more preferably, the distance of the first surface 1822 from the top surface 188 is about 9 mm. The distance of the second surface 1824 from the top surface 188 can range from about 12 millimeters (mm) to about 18 mm, alternatively from about 13 mm to about 17 mm, alternatively from about 14 mm to about 16. In some instances, the distance of the second surface 1824 from the top surface 188 is preferably between about 14 mm and about 16 mm, and more preferably, the distance of the second surface 1824 from the top surface 188 is about 15 mm. Generally, the distance of the second surface 1824 from the top surface 188 will always be 3 mm to 9 mm greater than the distance of first surface 1822 from the top surface 188. Again, the distances of the first surface 1822 and the second surface 1824 from the top surface 188 can be varied on the type of collectible 140 to be stored in the case 100.

When the collectible 140 is, for example, a trading card contained within a card protector, the first surface 1822 can have a height (as measured along H) that ranges from about 100 millimeters (mm) to about 125 mm, alternatively from about 110 mm to about 125 mm, alternatively from about 115 mm to about 125. In some instances, the length of the first surface 1822 is preferably between about 117 mm and about 123 mm, and more preferably, the height of the first surface 1822 is about 119 mm. The height of the second surface 1824 (as measured along H) can range from about 10 millimeters (mm) to about 25 mm, alternatively from about 10 mm to about 20 mm, alternatively from about 12 mm to about 18. In some instances, the height of the second surface 1824 is preferably between about 14 mm and about 16 mm, and more preferably, the height of the second surface 1824 is about 15 mm. Again, the heights of the first surface 1822 and the second surface 1824 relative to height H can be varied on the type of collectible 140 to be stored in the case 100.

In some instances, each shaped recess 182 can include a first surface 1822 and two second surfaces 1824 located on opposite ends of the first surface 1822. In such a configuration, when the collectible 140 is, for example, a trading card contained within a card protector, the distances of the first surface 1822 and the second surface 1824 from the top surface 188, as well as the height of each second surface 1824 (as measured along H) would be as described above. Resultantly, the height of the first surface 1822 (as measured along H) would be shorter due to the presence of the additional second surface 1824. Again, in a configuration having two second surfaces 1824, the heights of the first surface 1822 and the two second surfaces 1824 relative to height H, and the distances of the first surface 1822 and the two second surfaces 1824 from the top surface 188 can be varied based on the type of collectible 140 to be stored in the case 100.

Referring to FIG. 2, an ornamental and/or protective layer 184 is formed, adhered or affixed to the top padding surface 188 of the foam, and can be ornamental of ornamental material such as for example a paint (color(s)); protective of protective material such as for example a veneer or laminate; or both ornamental and protective (such as paint over a veneer). On one embodiment, the layer 184 is shown as a carbon fiber sheet. In some instances, the ornamental material 184 can be a single-or multi-colored sheet. In some instances, the ornamental material 184 can be in form of a sheet exhibiting a pattern, shape or image such as, for example, camouflage, paisley, herringbone, houndstooth, stripes, checkers, diamonds, stars, parquet, wood grain, flowers, nature scenes, works of art, landscapes, seascapes, cityscapes, and so on. In some instances, the ornamental material 184 can be in form of sports or card game themed sheet, for example related to the collectible 140. For example, the ornamental material 184 can have sport-themed images and/or a design indicative of, for example, a football theme, a baseball theme, a basketball theme, a soccer theme, or any other sport or any combination thereof. In some instances, the ornamental material can have card game-themed images and or a design indicative of, for example, a Magic the GATHERING® theme, a POKÉMON® theme, a YU-GI-OH!® theme, a DRAGONBALL Z® theme or any other card game or any combination thereof. In some instances, the ornamental material 184 is permanently adhered to the top surface of the padding 180. In some instances, the ornamental material 184 can be reversibly attached to the top surface 188 of the padding 180 to allow a user to change the theme of the ornamental material 184 as desired.

The base storage recesses 124 of the base padding 120 and the storage recesses 174 of the lid padding 160 are shaped and dimensioned to securely hold a plurality of collectibles 140 and protect the plurality of collectibles 140 against damage, such as by preventing them from sliding or shifting inside the case 100 during transport or in the event the case 100 is punctured or broken open or if the case 100 is otherwise inadvertently opened. And, the shaped display recesses 182 of the top portion 180 of the lid padding 160 are dimensioned to securely hold a single collectible 140 and prevent them from contacting one another and from contacting the inside surface of the display window 155 during transport. The base and lid padding 120, 160 (including the bottom portion 170 and the top portion 180) also cushion the collectibles during transport and absorbs sudden movements such as if the case 100 is dropped. The base padding 120, and the lid padding 160 can be made of any suitable material. In some instances, the paddings 120, 160 can be made of an ethylene-vinyl acetate (EVA) foam. In some instances, the paddings 120, 160 can be made of a polyethylene foam, a crosslinked polyethylene foam, a polyurethane foam, an expanded polyethylene/polypropylene foam, a latex foam, a polystyrene foam. The base padding 120 and/or the lid padding 160 are solid and sturdy material that is firm or stiff so that it can be repeatedly inserted and removed in one piece from the base section 110 and lid section 150 as needed, but does not scratch or damage the collectible protector case 1412.

In some instances, the base padding 120 and the lid padding 160 are from separate types of padding materials or from separate pieces of the same type of padding material. In some instances, the top portion 180 of the lid padding 160 and the bottom portion of the lid padding 160 are formed as a single piece of padding material. In other embodiments, the top portion 180 of the lid padding 160 and the bottom portion of the lid padding 160 can be separate pieces of padding material from separate types of padding materials or from separate pieces of the same type of padding material and are separated from each other by a layer of a durable material (such as, for example, aluminum or an alloy thereof, steel, carbon fiber, a polycarbonate (PC), a polyvinylchloride (PVC), a polyester reinforce fiberglass, a polymethylmethacrylate (PMMA), a polyethylene terephthalate (PET), a polyether ether ketone (PEEK), and so on). In such instances, the durable material layer separating the top portion 180 from the bottom portion of the lid padding 160 may be integrally formed with the some or all of the inner sidewall surfaces of the lid section 150. In some embodiments, the top and bottom portions 180, 170 of the lid padding 160 are made from a single piece of the same type of padding material. In such instances, shaped storage recesses 174 and the shaped display recesses 182 are formed into single piece of a padding material.

In some instances, one or more access panels can be located in the top 152 of the lid section 150, so that the display window 155 can be at least partially separated by, (for example, having the display window 155 coupled directly or indirectly with a sidewall of the lid section 150 with hinges) or completely separated from the lid section 150 to allow a user to access the collectibles 140 located in the shaped recesses 182 through the access panel without having to open the case 100 by use of the latches 154 and hinges 130. For example, the top 152 can be a thin sheet having one or more separate access panel and the one or more windows 155 can be formed in each access panel about one or more of the display recesses 182; whereby the access panel can open and close to permit and deny access to the collectible display recesses 182.

In some instances, such as when the top portion 180 and bottom portion of the lid padding 160 are made from a single piece of padding material, collectibles located in the shaped display recesses 182 can be accessed by the user removing the single piece of padding from the lid section 150 via the interior space of the case 100. Thus, the user opens the lid section 150 by opening the latches 154 and rotating the lid section 150 about the hinges 130 with respect to the base section 110. The user then removes the lid padding 160 to access the display recesses 182 at the top surface 188 of the lid padding 160. For example, the user can grab one of the interior storage walls 176 at the bottom portion 170 of the lid padding 160 to pull the lid padding 160 out of the lid interior space of the lid section 150. However, where only a single storage recess is provided in the lid padding, as shown in FIGS. 7(a), 7(c), 7(f), one or more finger slots 500 can be provided at one or more sides of the base padding that allows the user to grab and remove the base padding from the base section. The user can then insert, remove, change collectibles 140 in rigid collectible protector cases 1410 from the display recesses 182.

As best shown in FIG. 3(a), at least a portion of the corners 510 of the base padding and/or lid padding can but cut inward to have a cutaway corner section 512 that creates a space between the padding and the lid section or base section, to allow air to move and facilitate the padding being inserted and removed from the lid section and base section. The cutaway corner section 512 need not extend the entire depth of the padding, but can extend only partially into the padding from the top or bottom of the padding, to leave a corner portion 514 that extends to the inside corner of the lid section of the case, though in some embodiments the entire corner 500 can be cutaway. In the embodiment shown, the cutaway 512 is a linear angle that forms a planar surface at approximately 45 degrees to face the corner of the lid section of the case. However, other suitable shapes can be provided. In addition, the cutaway 512 is shown at all four corners of the padding, but can be provided at fewer corners. Moreover, the cutaway can be provided at any other location on the padding, including at any of the sides or middle of the padding.

As illustrated in FIG. 1(a), the case 100 can be described as having a length, height, and width or depth dimensioned to provide the case 100 with a generally cuboidal (or "briefcase" type) shape and four internal collectible storage compartments in a single row (a "4×1") configuration. In some instances, the case 100 may exhibit a larger or smaller length, height or depth to accommodate more internal collectible storage compartments to result in, for example, a single configuration (FIGS. 7(a)-7(f)), a double configuration (FIGS. 6(a)-6(d)), a triple configuration (FIGS. 5(b)-5(d)), or to provide a single row having more than four recesses 124, 174, 182, or having multiple rows of recesses 124, 174, 182. As can be appreciated, the increase in depth of the case 100 can provide stacked rows, for instance, an upper base padding 120 placed on top of an lower base padding 120, and the upper base padding 120 can have bottom recesses that receive the top end of collectible protector cases stored in the lower base padding.

In some instances, the case 100 may exhibit a larger length for the ability to accommodate additional rows of four internal collectible storage compartments to result in, for example, a 4(compartment)×2(row) configuration, a 4×3 configuration, a 4×4 configuration, a 4×5 configuration, a 4×6 configuration, and so on. As one of ordinary skill in the art may appreciate enlarging the height to an extent that results in a greater number of rows of internal collectible storage compartments may result in a case 100 having a height larger than its length. Also, as can be appreciated, the increase in height or depth will also increase the number of collectible display compartments in the same or a similar fashion.

In some instances, the case 100 may exhibit a larger length and a larger height for the ability to accommodate varying numbers of internal collectible storage compartments in various numbers of rows such as, for example, a 5(compartment)×3(row) configuration, a 5×4 configuration, a 5×5 configuration, a 5×6 configuration, a 6×3 configuration, a 6×4 configuration, a 6×5 configuration, a 6×6 configuration, an 8×3 configuration, an 8×4 configuration, a 10×3 configuration, a 12×3 configuration, and so on. As can be appreciated, the increase in height and length will also increase the number of collectible display compartments in the same or a similar fashion.

In some instances, the case 100 may exhibit a smaller height and a larger length for the ability to accommodate varying numbers of internal collectible storage compartments in various numbers of rows such as, for example, a 3(compartment)×2(row) configuration, a 3×3 configuration, a 3×4 configuration, and so on. As can be appreciated, the change height and length will also alter the number of collectible display compartments in the same or a similar fashion.

Operation

FIG. 4 shows the lid padding 160 with the lid display recesses 182 in use with a first collectible 1410 contained in a first collectible protector case 1412 and a second collectible 1420 contained in a second collectible protector case 1422. As shown, the top portion 180 of the lid padding 160 includes a first collectible 1410 in a first protector case 1412 in a first display recess 182 and a second collectible 1420 in a second protector case 1422 in a second display recess 182. The first collectible protector case 1412 is in a display configuration, where it is fully received in the display recess 182. The first collectible protector case 1412 lies flat against the top surface 181 of the recess 182, and is recessed with respect to the top surface 188 of the top portion 180 of the lid padding 160.

The second protector case 1422 is in the process of being removed from a display configuration in the second display recess 182, which is further illustrated in FIG. 11. In operation, the collectible case 1422 can be released, and subsequently completely removed, from the recess 182. The user pushes inward on one end portion of the collectible case 1422 (here, the bottom end) in a downward direction relative to top surface 188, which causes the bottom end portion of the collectible case 1422 to enter into the extraction channel 1821, and may or may not touch the second surface 1824 of the channel 1821. As the bottom end portion of the collectible case 1422 is depressed and enters into the channel 1821, the remainder of the collectible case 1422, located in a region of the recess corresponding to the first surface 1822, pivots upward about the stiff padding edge or lip 1826 formed between the first and second surfaces, and out of the display recess 182. Thus, as shown, the top end of the protector case 1422 pivots upward away from the padding top surface 188. At that point, the top end no longer is recessed below the padding top surface 188, but instead protrudes outward from the padding top surface 188. The user can then grab the freed top end of the protector case 1422 and remove the collectible 140 from the recess 182. The user can insert the protector case 1422 into the display recess 182 in a similar manner, namely by inserting the bottom end into the extraction channel 1821, then pushing down on the top end of the case 1422 to pivot the case 1422 into a recessed display position in the display recess 182.

Thus, the case 100 allows a plurality of collectibles 140 to be stored inside the case 100, within the storage recesses 124, 174. The base storage recesses 124 are shorter than the length of the collectible, so that the collectible extends out of the base storage recess 124 so that the collectible can be easily grabbed by the sides and readily inserted and removed by the user. Thus, the lid padding 160 has storage recesses 174 to fully enclose the collectible 140 when the case is closed. In other embodiments, the lid padding 160 need not have storage recesses 174 and instead can be a flat or uneven cushioned flexible surface. The base storage recesses 174 can still allow the collectible to project out of the base storage recess 174, or the collectibles can be substantially flush with the top of the base storage recesses 174.

The user can open the case 100 (FIG. 1(*a*)) to insert and remove collectibles in the base storage recesses 174. And the user can remove the lid padding 160 (FIG. 1(*b*)) to insert and remove collectibles in the display recesses 182. Once a collectible is inserted into a display recess 182, the padding 160 is inserted back into the lid section 150 until the top surface 188 of the lid padding 160 contacts the top display window 155. The collectible is slightly recessed in the display recess 182, so that the collectible does not touch the display window 155. The lid section 150 is then closed, and latched. The first surface 1822 of the display recess 182 is planar and substantially parallel to the planar display window 155, so that the display recesses 182 position the collectibles to face the display window 155 (FIG. 5(*a*)). The collectibles positioned in the display recesses 182 can then be viewed by the user through the top window 155. During transport and/or storage, the collectibles can be located in the display recesses 182, but preferably all of the collectibles are in the storage recesses 124, 174 and not in the display recesses 182. The storage recesses 174 position the collectibles to stand upright, substantially orthogonal to the lid and base sections 150, 110. When the case is closed, the collectibles are fully enclosed by the recesses 124, 174. The display recesses 182 can be relatively shallow, and have a depth slightly larger than the thickness of the collectible, so that the collectible is slightly recesses with respect to the top surface of the padding.

It is further noted that additional features may be included in case 100. For example, portions of the case 100 can include interior and/or exterior lights to illuminate the collectibles 140 when displayed in the lid section 150. For example, lights can be positioned about the collectibles 140 and inside the display window 155. The case 100 may include seals disposed between the connection points of the bottom section 110 and the lid section 150 to form an air-tight and liquid-tight seal when in the closed position to protect the collectible 140.

In some instances, a suitable type of latch, such as, for example, cam latches, compression latches, slam latches, draw latches, spring latches, push-to-close latches, hasps, and so on, can be used instead of the hinges 130. In such instances, the lid section 150 can be entirely configured to be disengaged and separated from the base section 110.

In addition, the channels 1821 can be provided in any other suitable recess, such as the storage base recesses 124 (FIG. 1(*a*)), to facilitate remove of collectibles stored therein. For example, the channels in the base recesses 124 can extend along the length of the storage recess 124 at the bottom surface of the recess, so that the collectible can be pushed at one side (for example, the top left corner or top right corner) to pivot the collectible about the channel edge and rotate the collectible transversely right or left to facilitate removal of the collectible from the storage recess 124. And the top end of the base storage side wall opposite the channel can be curved outward to allow movement of the protector card case.

In yet another embodiment of the disclosure, the base padding 120 and/or the lid padding 160 can also be configured as a wall-mount display device. That is, the base padding 120 and/or lid padding 160 can have wall-mount features to attach the padding 120, 160 to a wall, such as a hanger or holes. The padding 120, 160 can also be provided with a rigid structure, such as a veneer or solid layer at the rear surface of the padding 120, 160 that provides support to the padding 120, 160 to be hung on the wall. Thus, the padding 120, 160 can be removed from the case 100 and hung on the wall for display of the collectibles.

Wall Mount Display Case

It is further noted that the channels 1821 (FIGS. 3(*a*), 3(*b*)) can be utilized in other display cases. For example, FIGS. 8-11 show a wall-mount collectible display case 200 in accordance with another embodiment of the present disclosure. The wall-mount display case 200 can be any suitable display case having a body 202 (for example, a foam) with one or more display openings or recesses 210, such as shown for example in U.S. Publ. No. 2022/0386791 and U.S. Publ. No. 2020/0407144 to the present inventor, the entirety of which are hereby incorporated by reference. Each display recess 210 receives a single individual protector case and the case is recessed with respect to the top surface of the display case within the display recess 210. The display recess 210 has a flat or planar top surface 212 that is substantially parallel to the top surface of the display case 200 and faces outward. A top channel 214 is formed at the top end of the recess 210, and/or a bottom channel 214 is formed at the bottom end of the recess 210. The channel 214 forms a bottom surface 216 that is parallel to the top surface 212 and further recessed with respect to the top surface 212. The lip or edge 218 is formed between the top surface 212 and the bottom surface 216.

The collectible is a flat card or sheet, similar in shape as shown in FIGS. 1(*a*), 1(*b*), 4, 5. The collectible has a top surface and bottom surface that are planar and parallel to the top and bottom surfaces 212, 216. In a display configuration, the collectible is placed in the display recess 210 and is held in place by the sides of the display recess 210. When the user wants to remove the collectible, the user presses inward against the top or bottom ends of the collectible. As illustrated in FIG. 10, if the top end is depressed, it pivots about the channel lip 218 and moves (as shown by arrow 220) into the top channel at the top end of the recess, forcing the bottom end (as shown by the arrow 222) of the collectible outward at which point the bottom end can be grabbed by the user. If the bottom end of the collectible is depressed (i.e., pushed) inward, it pivots about the channel lip 218 and moves into the bottom channel at the bottom end of the recess, forcing the top end of the collectible outward at which point the top end can be grabbed by the user.

Thus, the case 200 is provided for storage and/or display of a collectible. The case has a body 202, and one or more recesses in the body configured to securely retain the collectible. Each recess has a first recess end (e.g., the top end) and a second recess end (e.g., the bottom end) opposite the first recess end. A channel 214 is formed at the first recess end and/or the second recess end. The channels 214 form a sturdy pivot point 218 adjacent the channel 214. A first collectible end (e.g., top end) of a single collectible is depressed, the single collectible pivots about the pivot point 218 to position the first collectible end into the channel and position a second collectible end (e.g., lower or bottom end) outside of the display recess for removal.

The recess has a recess surface 212 and the channel has a channel surface 216. The recess surface and the channel surface extend an entire width or length of the recess. The depth of the channel surface is greater than the depth of the recess surface. In addition, the collectible can have a collectible housing which is configured to removably receive the collectible, and the collectible 140 alone or the collectible held inside the collectible housing (i.e., protector case) can be retained in the recess 210. A wall-mounting feature (e.g., a hole, fastening device) can be located on the case to mount the case to a wall structure. In the embodiment where there are a plurality of recesses in the body, each of the plurality of recesses are configured receive a respective single one of a plurality of collectibles; for example, the recesses have the same shape as the collectible (or collectible housing) and a relatively same size (or either slightly smaller or larger than the collectible to form a reliable and suitable fit, such as a friction fit or snug fit).

It is also noted that the collectibles shown and described are substantially rectangular. However, it will be recognized that the collectible can be any suitable collectible item having any suitable shape, such as a round coin or a spherical, oval, square, rectangular or polygonal toy, or the like. As such, each display recess 182 and/or storage recess 124, 174, can have a shape sized to securely hold a coin, toy or other collectible having any particular shape. In addition, the collectible item can be located inside a protector such as a housing, or can be without a protector.

In addition, the padding 120, 160, and the wall-mount case 200 have been shown and described as having a body 120, 160, 202, that is made of a foam material. That material can be a soft or pliable foam, or can be a relatively sturdy foam that has sufficient rigidity to support and retain a collectible and/or be inserted and removed from the base section 110 and top section 150 of the carrying case 100, and/or to be wall-mounted. However, other suitable embodiments are envisioned, such that the material can be a rigid plastic, wood or other material. In other embodiments, the material can be a rigid plastic, wood or other material, and have a foam lining that at least partly or fully formed about the walls of the recesses 124, 174, 182, 210 to protect the collectible against damage and movement.

Removal Features

Figure 12:
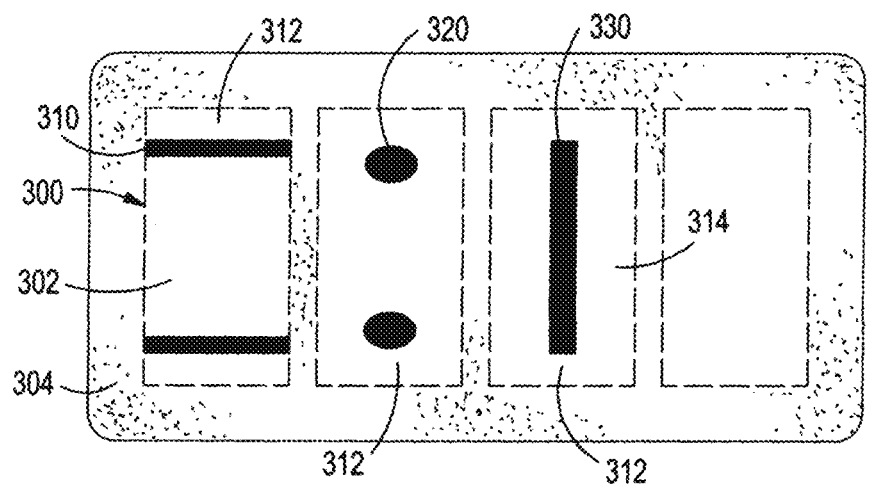
FIG. 12 is a front view of a lid padding showing other embodiments of the lid display recess to insert and remove a collectible protector case from the lid display recess.

In the above embodiments, the disclosure shows and describes that the display recesses 182, 210 have an extraction channel 214 that enables the collectible protector card 1412 to be pivoted about a pivot point to raise a far end that can be grabbed by the user to then remove the collectible 1410. As shown in FIG. 12, other suitable features can be provided within the spirit and scope of the disclosure, such as transverse ridges 310, circular (or square) bumps 320, or a longitudinal ridge 330. For example, the display recess 300 has a recess bottom surface 302 that is planar, and has two or more bars or ridges 310 that extend upward along at least a portion of the recess bottom surface 302. The ridges 310 are elongated and can have a cross-section that is shaped as a square, rectangle, curved, or a half-circle. The ridges 310 are set a distance from the extreme top and bottom of the display recess 300, to provide an open area 312 for the top or bottom of the protector case to rotate. In a display position, the collectible protector case 1412 rests on the top surface of the ridges, and is recessed with respect to the top surface 304 of the padding.

To remove the protector case, the user presses on the top or bottom end of the protector case. The protector case pivots about the ridge 310 and the proximal end of the protector case enters the proximal open area. The distal end of the protector case rotates upward out of the display recess 300. The user can grab the distal end and remove the protector case from the display recess 300.

The bumps 320 and longitudinal ridge 330 operate in the same manner, whereby an open rotation area 312 is provided at the top and/or bottom of the display recess 300. In addition, the bumps 320 or vertical ridge 330 has open side spaces 314 to the sides of the recess 300, such that the user can press on the sides of the collectible protector case to push the side into the open side space 314 so that the opposing side of the protector case projects out of the recess 300 and can be easily grabbed by the user and removed from the recess 300. Numerous other removal features or mechanisms can be utilized where the protector case is removably received in the display recess at a recessed position to the padding surface, reliably held in position in the recessed display position, and easily removed from the display recess by mechanical, electrical or other mechanisms or means that eject the card protector from the display recess, with or without a pivot point. For example, an electrical solenoid can be positioned in an opening provided at one end of the recess bottom surface 302 and operated by a button to eject the card protector case. Or a mechanical spring-actuated ejector can be positioned in an opening at one end of the recess bottom surface 302. The user presses the spring ejector downward with the card protector during insertion of the card protector, and the spring stays in the depressed position. To remove the card protector, the user presses further downward on the ejector to release the spring to push the card protector out of the display recess.

In yet other example embodiments of the disclosure, there need not be a recess. Instead, the padding top surface 304 can be planar, and one or more magnets can be positioned beneath the padding top surface 304 to engage respective one or more magnets attached to the protector case (inside or outside). The user can grab the sides of the protector case, or move the protector case slightly to the side to release the magnetic force, and remove the card protector.

In the embodiments shown and described, there is an equal number of display recesses 182 as storage recesses 124, 174. In addition, the lid display recesses 182 are aligned with the lid storage recesses 172, albeit on opposite sides of the lid padding 160 with padding positioned between the lid display recess 182 and aligned lid storage recess 172. However, in other embodiments, there can be more or fewer display recesses 182 as storage recesses 124, 174. In addition, one or more access openings can be provided in the padding at the bottom surface of the lid display recess 182. The access opening can extend through the entire lid padding 160, so that a user can insert a finger through the access opening to push out the card protector located in the display recess 182. That access opening can be, for example, in the padding that separates the display recess 182 from the lid storage recess 174.

FIGS. 1(*b*), 6(*b*), 6(*d*), 7(*b*), 7(*d*) show yet another example of the disclosure. Here, the display recesses 400 have a bottom surface 410 that is uniform and does not have a channel, bump, or ridge. Instead, a finger slot 412 is provided at one or more of the sides of the display recess 400. In the embodiment shown, a single finger slot 412 is provided at the top end of the display recess 400. The finger slot can be curved, as shown, and extend from the padding top surface 402 to the recess bottom 410, below the recess bottom 410, or at least partly to the recess bottom 410. In a display position, the card protector case is recessed with respect to the padding top surface 402. To remove the protector case, the user inserts a finger into the finger slot 412 and grabs the side or underside of the protector case and can lift the protector case out of the display recess 400. The finger slot 412 can have any suitable shape, such as a half-circle, oval, curved, square or rectangle.

Figure 13A:
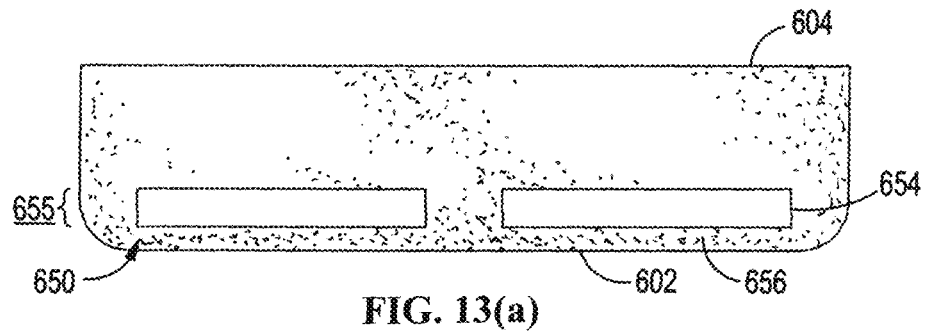
FIG. 13(a) is a side view of another embodiment of the lid padding and lid display recess.
Figure 13B:
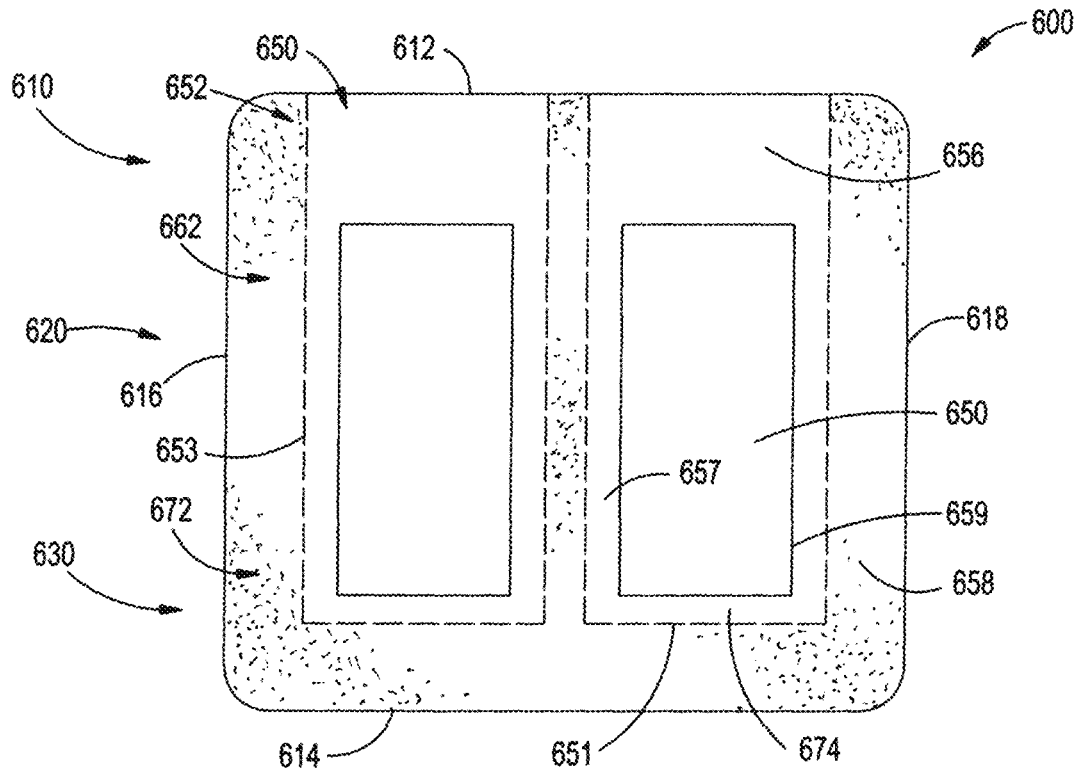
FIG. 13(b) is a front view of the lid padding of FIG. 13(a).

Turning to FIGS. 13(*a*), 13(*b*), yet another embodiment of the lid padding 600 is described, which can be used as the lid foam 160, for example, that is received in the lid section 150 of the display case 100 of FIG. 1(*a*). Here, the lid padding 600 has a top portion with a top surface 602, and a bottom portion with a bottom surface 604. The top surface 602 is front facing when placed in the lid section 150, that faces the display window 155. The bottom surface 604 faces inwardly when received in the lid section 150, and can optionally have one or more storage recesses (not shown) such as the storage recesses 174 of FIG. 1(*a*). The padding 600 also has a padding top end portion 610 with a padding top side 612, padding bottom end portion 630 with a padding bottom side 614, and a padding intermediate or middle portion 620 between the padding top and bottom end portions 610, 630. The lid padding 600 further has four padding sides, including the padding top side 612, the padding bottom side 614, a padding left side 616, and a padding right side 618. The padding left and right sides 616, 618 are at the padding middle portion 620, as well as the padding top and bottom end portions 610, 630. The padding top and bottom sides 612, 614 define a length (x-direction) of the padding 600, and the padding left and right sides 616, 618 extend along the height (y-direction) of the padding 600. FIG. 13(*a*) shows a depth of the lid padding 600.

The lid padding 600 includes one or more display recesses 650. In the embodiment shown, there are two display recesses 650, such as for use with the case of FIGS. 6(*a*)-6(*d*). Each recess 650 has a length (x-direction) 651, height (y-direction) 653, and depth (z-direction) 655. The recess length 651 and recess depth 655 can be slightly larger than the length and depth of the collectible protector case, so that the protector case can easily slide into and out of the recess 650. The recess height 653 extends from the padding top side 612 of the padding 600, through the padding top end portion 610, to the padding middle portion 620, and to (or partly including) the padding bottom end portion 630, but does not extend to the padding bottom end 614, so there is padding at the bottom end of the recess 650. The recess 650 has a top recess portion 652, bottom recess portion 672, and an intermediate or middle recess portion 662. In some embodiments, the recess 650 can extend completely through the padding 600 from the top end 612 to the bottom end 614, and the middle portion 620 can have a smaller depth 655 that forms a friction fit with the protector case so that the protector case stays positioned in the recess display window 659.

The recess 650 is partially covered by a foam layer that extends about and defines a recess display window 657. The foam layer has a foam layer top portion 656, a foam layer bottom portion 674, a foam layer left side portion 657, and a foam layer right side portion 658. The foam layer top and bottom portions 656, 674 extends completely across (from a left recess side to the right recess side) at the top and bottom recess portions 652, 672, respectively. The foam left and right side portions 657, 658 extend completely from the bottom recess side to the top recess side. The foam layer bottom portion 674 and side recess portions 657, 658 partially extend into the recess 650. The foam layer top, bottom and side portions 656, 674, 657, 658 together surround and define the recess display window 659, and also define a passageway 654 beneath the foam layer top, bottom, and side portions 656, 674, 657, 658. The passageway 654 includes a top tunnel section beneath the foam layer top portion 656, where the recess 650 is surrounded on the top by the foam layer top portion 656, and on the bottom and sides by padding. The passageway 654 also includes left, right and bottom passageways that extend beneath the foam layer left side, right side and bottom portions 657, 658, 674, respectively.

The recess display window 659 has a recess display length, recess display height and recess display width that is smaller than the recess length, height and width 651, 653, 655, respectively. As illustrated, the passageway 654 is elongated and formed or cut in the lid padding 600 along the padding width (FIG. 13(*a*)), toward and adjacent to (but at a distance from) the padding top surface 602, so that a collectible protector case 1412 can be slidably received by and into the top passageway of the passageway 654 from the padding top side 612, in a lengthwise manner. That is, the collectible protector case bottom forms the leading edge that enters the passageway 654. However, in other embodiments, the passageway 654 can be formed through the padding left and/or right side 616, 618, and the collectible protector case 1412 can be slidably received by and into the right and/or left passageways from the left and/o right sides 616, 618, respectively, in a widthwise manner. That is, the collectible protector case side forms the leading edge that enters the passageway 654. In still other embodiments, the passageway can be formed through the padding bottom surface 604 and received in a depth wise manner where the front face of the collectible display case is the leading surface that enters the passageway.

In operation, the user removes the lid padding 600 from the lid section 150. The user then aligns the leading edge of the collectible protector case 1412 with the opening of the passageway 654, and inserts the collectible protector case 1412 into the passageway 654. The passageway 654 can be tapered outward at the opening to form a ramp that guides the collectible protector case into the passageway 654. The ramp can extend at the sides of the passageway, or all around the entire passageway (top, bottom and sides). The ramp and/or the entire passageway 654, can optionally have a coating or smooth layer that makes it easier for the rigid plastic protector case to slide into the opening. The user continues to press the collectible protector case into the passageway until it reaches the bottom recess portion 672 and is received at the bottom passageway 674. Since the passageway 654 is larger than the protector case, the protector case readily slides into the passageway 654. However, the user can also, for example, push the protector case from the padding top side 612 and insert a finger into the passageway. Or the user can further push the collectible case through the top opening formed by the display window 659. When fully received, the protector case is prevented from moving up and down by the foam layer top, left, right, and bottom portions 656, 657, 658, 674.

In addition, a retention mechanism can be provided to keep the collectible case positioned at and aligned with the display window 659. For example, one or more soft foam retention member can extend outward from the inner side surface of the foam layer top, left, right and/or bottom portions 656, 657, 658, 674 into the respective top, left, right and/or bottom passageways. The retention member narrows the depth of the passageway to engage the protector case and keep the protector case positioned and aligned at the display window 659. In other embodiments, the retention mechanism can be a gate can be positioned in the foam layer top portion 656 that extends through a slot in the foam layer top portion 656 to block the protector case from escaping through the passageway top portion. Or a padding filler can be placed into the passageway after the collectible case is fully received in the passageway, and the filler would be kept in place by contacting a side wall of lid section 150. Of course, other suitable retention mechanisms can be provided within the spirit and scope of the present disclosure.

It is noted that the display window 659 is shown as an open top to the recess 650. However, a transparent cover can be positioned at the open top, such as a plastic that extends into a separate cover passageway in the foam that is above the collectible passageway 654.

It is further noted that the recess 650, including the passageway 654 and window 659 need not be used just with a lid padding 600 or the display carrying case of FIG. 1(a). Rather, for example, the recess 650 can be used for a wall mount display case, such as shown for example in FIG. 9. Here, the passageway 654 can be formed from the rear or back side of the wall mount display padding. The passageway can have the same length and height as the protector case, and can be held in the window at the front of the wall mount display by a retention mechanism, such as for example a friction fit with the passageway a retention member or a fastener at the back side of the wall mount. Other suitable retention mechanisms can be provided within the spirit and scope of the present disclosure.

It is further noted that the lid padding 160, 600 need not be used with the base padding 120, and the lid display recesses 182, 650 need not be used with the lid storage recesses 174 and/or the base storage recesses 124. For example, the lid display recesses 182, 650 can be used alone on a lid padding, without a base padding. For example, the case can be a briefcase or suitcase and clothing or other objects can be loosely received in the base section and the lid section can be fitted with a lid padding having lid display recesses. In addition, the base padding 120 can be used without the lid padding, such as in a briefcase or suitcase and clothing or other objects can be loosely received in the lid section. And, the base storage recesses can be used with lid storage recesses, but without a display window and without lid display recesses. Other applications can be made within the spirit and scope of the present disclosure.

It is further noted that although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

It is noted that the drawings may illustrate, and the description and claims may use geometric or relational terms, such as right, left, side, top, bottom, end, portion, section, rectangular, planar, flat, circular, rectangular, square, cuboid, length, width, height, depth. These terms are not intended to limit the disclosure and, in general, are used for convenience to facilitate the description based on the examples shown in the figures. For instance, though the length, height, and width are used above to refer to the x-, y-, and z-directions, respectively, the terms can be interchanged, and for example the height can refer to the x-direction and the length can refer to the y-direction. The foregoing description and drawings should be considered as illustrative only of the principles of the disclosure, which may be configured in a variety of shapes and sizes and is not intended to be limited by the embodiment herein described. Numerous applications of the disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

What is claimed is:

1. A case for storage and/or display of a collectible, the case comprising:
    a base section;
    a lid section comprising a display window, the lid section coupled with and moveable relative to the base section to allow the case to transition between a closed position and an open position to access an interior space within the case;
    base padding contained within the base section at the interior space, the base padding comprising a plurality of storage recesses, each of the plurality of storage recesses configured to hold one or more collectibles;
    lid padding contained within the lid section at the interior space, the lid padding having one or more display recesses, each of the one or more display recesses configured to hold a single collectible for display to a user through the display window; and
    a channel positioned at an end of the one or more display recesses and forming a pivot point adjacent the channel, whereby when a first end of the single collectible is depressed, the single collectible pivots about the pivot point to position the first end into the channel and position a second end outside of the display recess for removal.

2. The case of claim 1, wherein each of the one or more display recesses has a first surface and the channel has a second surface, each of the first surface and the second surface extending an entire width of the display recess, the second surface located at an end of the display recess, the depth of the second surface being greater than the depth of the first surface.

3. The case of claim 1, wherein the base section and the lid section are coupled with hinges to allow the case to transition between the closed position and the open position.

4. The case of claim 1, wherein the collectibles are sports trading cards or gaming trading cards.

5. The case of claim 1, wherein the one or more display recesses are configured to position the single collectible to face the display window.

6. The case of claim 1, wherein the one or more display recesses have a top surface that is parallel to the display window.

7. The case of claim 1, wherein the display window is transparent.

8. The case of claim 1, said lid padding removably received in the lid section, wherein the collectibles can be removably inserted into the one or more display recesses when the lid padding is removed from said lid section, and the collectibles are visible through the display window when the lid padding is received in said lid section.

9. The case of claim 1, wherein the collectible is contained in a protector case.

10. The case of claim 1, wherein said base padding is removably received in said base section.

11. The case of claim 10, further comprising a wall-mounting feature located on said base padding to mount said base padding to a wall structure.

12. The case of claim 1, wherein said lid padding is removably received in said lid section.

13. The case of claim 12, further comprising a wall-mounting feature located on said lid padding to mount said lid padding to a wall structure.

14. A case for storage and/or display of a collectible, the case comprising:
- a base section,
- a lid section comprising a display window, the lid section coupled with and moveable relative to the base section to allow the case to transition between a closed position and an open position to access an interior space within the case;
- base padding contained within the base section at the interior space, the base padding comprising a plurality of storage recesses, each of the plurality of storage recesses configured to hold one or more collectibles;
- lid padding contained within the lid section at the interior space, the lid padding having one or more display recesses, each of the one or more display recesses configured to hold a single collectible for display to a user through the display window, said lid padding having a top portion and a bottom portion, wherein said one or more display recesses are located in the top portion of said lid padding, and
- one or more further storage recesses located in the bottom portion of said lid padding, each further storage recess aligned with one of the plurality of storage recesses in said base padding.

15. The case of claim 14, wherein the collectibles are trading cards.

16. The case of claim 14, wherein the one or more display recesses have a top surface that is parallel to the display window.

17. The case of claim 14, said lid padding removably received in the lid section, wherein the collectibles can be removably inserted into the one or more display recesses when the lid padding is removed from said lid section, and the collectibles are visible through the display window when the lid padding is received in said lid section.

18. The case of claim 14, wherein the collectible is contained in a protector case.

19. The case of claim 14, wherein said base padding is removably received in said base section.

20. The case of claim 19, further comprising a wall-mounting feature located on said base padding to mount said base padding to a wall structure.

21. The case of claim 14, wherein said lid padding is removably received in said lid section.

22. The case of claim 21, further comprising a wall-mounting feature located on said lid padding to mount said lid padding to a wall structure.

* * * * *